(12) United States Patent
Horie

(10) Patent No.: US 7,937,077 B2
(45) Date of Patent: May 3, 2011

(54) ELECTRONIC APPARATUS AND COMPUTER-READABLE RECORDING MEDIUM

(75) Inventor: Hidekazu Horie, Tokorozawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 989 days.

(21) Appl. No.: 11/717,279

(22) Filed: Mar. 13, 2007

(65) Prior Publication Data

US 2007/0213041 A1 Sep. 13, 2007

(30) Foreign Application Priority Data

Mar. 13, 2006 (JP) ................................ 2006-067198
Mar. 5, 2007 (JP) ................................ 2007-054872

(51) Int. Cl.
*H04M 3/00* (2006.01)

(52) U.S. Cl. ...................................... 455/418; 455/419

(58) Field of Classification Search .................. 455/418, 455/419
See application file for complete search history.

(56) References Cited

U.S. PATENT DOCUMENTS 6,556,810 B2 * 4/2003 Suzuki ............................ 455/88
6,687,497 B1 * 2/2004 Parvulescu et al. ........... 455/420
6,993,329 B2 * 1/2006 Cho et al. ....................... 455/420
7,035,628 B2 * 4/2006 Rindsberg et al. ............ 455/418
7,184,756 B2 * 2/2007 Kelley et al. .................. 455/418

FOREIGN PATENT DOCUMENTS

| JP | 11-308163 | | 11/1999 |
| JP | 2002-101188 | | 4/2002 |
| JP | 2002-118644 | | 4/2002 |
| JP | 2002101188 A | * | 4/2002 |
| JP | 2002101188 A | * | 4/2002 |
| JP | 2002-199454 | | 7/2002 |
| JP | 2002199454 A | * | 7/2002 |

OTHER PUBLICATIONS

Office Action dated Jul. 8, 2008 issued for the counterpart Japanese Patent Application No. 2007-054872 (2 pgs.).

* cited by examiner

*Primary Examiner* — Nick Corsaro
*Assistant Examiner* — Sowmini Nair
(74) *Attorney, Agent, or Firm* — Cohen Pontani Lieberman & Pavane LLP

(57) ABSTRACT

An electronic apparatus, such as a mobile phone, that has a plurality of applications, displays an icon menu listing icons corresponding to the plurality of applications on its display section. The electronic apparatus stores an application operation setting table, which stores, for each of the plurality of applications, setting information regarding whether or not an RF block is to be driven in parallel with execution of the application. When displaying the icon menu, the electronic apparatus displays an icon corresponding to an application which is set not to drive the RF block in parallel with execution of it, by adding an icon indicating that the RF block is not to be driven, based on the setting information stored in the application operation setting table or setting information input from an input section.

5 Claims, 20 Drawing Sheets

| APPLICATION NAME | ICON DISPLAY POSITION | SUB-TABLE NUMBER | ... | WIRELESS COMMUNICATION FUNCITON TO BE USED OR NOT TO BE USED | RADIO WAVE OFF SETTING FLAG |
|---|---|---|---|---|---|
| BARCODE READER | (1, 1) | 0001 | ... | NOT TO BE USED | 1 |
| MEDIA PLAYER | (1, 2) | 0002 | ... | NOT TO BE USED | 1 |
| MEMORY CARD | (1, 3) | 0003 | ... | NOT TO BE USED | 1 |
| MOVING PICTURE | (2, 1) | 0004 | ... | TO BE PARTIALLY USED | 1 |
| CAMERA | (2, 2) | 0005 | ... | TO BE PARTIALLY USED | 1 |
| DATA FOLDER | (2, 3) | 0006 | ... | TO BE PARTIALLY USED | 0 |
| BROWSER | (3, 1) | 0007 | ... | TO BE USED | — |
| FUNCTION SETTING | (3, 2) | 0008 | ... | TO BE PARTIALLY USED | 1 |
| DOCUMENT VIEWER | (3, 3) | 0009 | ... | NOT TO BE USED | 1 |
| NETWORK SERVICE | (4, 1) | 0010 | ... | TO BE USED | — |
| ALARM | (4, 2) | 0011 | ... | TO BE PARTIALLY USED | 0 |
| CONVENIENT TOOL | (4, 3) | 0012 | ... | NOT TO BE USED | 1 |

| SUB-TABLE NUMBER: 0005 | | |
|---|---|---|
| SUB-APPLICATION NAME | ... | WIRELESS COMMUNICATION FUNCITON TO BE USED OR NOT TO BE USED |
| PHOTOGRAPHING | ... | NOT TO BE USED |
| PHOTO DATA BROWSING | ... | NOT TO BE USED |
| PHOTO DATA E-MAILING | ... | TO BE USED |

FIG. 4

| WIRELESS COMMUNICATION FUNCITON TO BE USED OR NOT TO BE USED | RADIO WAVE OFF SETTING FLAG | RADIO WAVE OFF DATE | | RADIO WAVE OFF TIME | |
|---|---|---|---|---|---|
| | | START DATE | END DATE | START TIME | END TIME |
| NOT TO BE USED | 1 | | | | |
| NOT TO BE USED | 1 | | | | |
| NOT TO BE USED | 1 | | | | |
| TO BE PARTIALLY USED | 1 | | | | |
| TO BE PARTIALLY USED | 1 | | | | |
| TO BE PARTIALLY USED | 0 | | | | |
| TO BE USED | — | | | | |
| TO BE PARTIALLY USED | 1 | | | | |
| NOT TO BE USED | 1 | | | | |
| TO BE USED | — | | | | |
| TO BE PARTIALLY USED | 0 | | | | |
| NOT TO BE USED | 1 | | | | |
| ⋮ | ⋮ | ⋮ | ⋮ | ⋮ | ⋮ |

DATE DESIGNATION MENU

| | DAY | MONTH | YEAR |
|---|---|---|---|
| START DATE: | | | |
| | ∫ | | |
| END DATE: | | | |

TIME DESIGNATION MENU

| | HOUR | MINUTE |
|---|---|---|
| START TIME: | | |
| | ∫ | |
| END TIME: | | |

ELECTRONIC APPARATUS AND COMPUTER-READABLE RECORDING MEDIUM

BACKGROUND OF THE INVENTION

1. Field of the Invention

The present invention relates to an electronic apparatus having a wireless communication function, and a computer-readable recording medium.

2. Description of the Related Art

As an electronic apparatus having a wireless communication function, a wireless communication terminal such as a mobile phone, etc. is known.

A mobile phone radiates a radio wave by its wireless communication function. The radiated radio wave might give influences on the operations of other electronic apparatuses. Especially, in hospitals, airplanes etc., radio waves might give serious influences on the operations of other precision electronic apparatuses. Therefore, in order to make the wireless communication function ineffective, the power of the mobile phone is turned off.

Recently, mobile phones have been multi-functionalized, and some have an address book search function, a music play function, and others, in addition to the wireless communication function. Mobile phones have various applications utilizing these functions.

Some applications of the mobile phones do not use the wireless communication function. Therefore, if the wireless communication function can be made ineffective without the mobile phone being turned off, the user can use the applications that do not utilize the wireless communication function, with no radio wave giving influences on the operations of other electronic apparatuses.

For example, Unexamined Japanese Patent Application KOKAI Publication No. 2002-101188 discloses a technique for making a wireless communication terminal function as a mere address book searching apparatus or music playing apparatus, by making the wireless communication function ineffective without turning off the power of the wireless communication terminal.

Specifically, the user sets the wireless communication function ineffective (off) from a function setting menu or the like of the mobile phone, when he/she brings the mobile phone into a hospital, an airplane, etc. After this, the user selects any application that does not use the wireless communication function from a plurality of applications provided in the mobile phone, and uses it.

However, the technique described in Unexamined Japanese Patent Application KOKAI Publication No. 2002-101188 is inconvenient for the user because it requires, when the user is to use an application of the mobile phone, that he/she recognize which applications can be used with the wireless communication function set off.

SUMMARY OF THE INVENTION

The present invention was made in view of the above-described circumstance, and an object of the present invention is to provide an electronic apparatus which allows a user to easily switch between the effective status and the ineffective status of the wireless communication function, application by application, and a computer-readable recording medium.

To achieve the above object, an electronic apparatus according to a first aspect of the present invention is an electronic apparatus having a plurality of applications, and comprises:

a wireless communication unit which performs wireless communication, when it is activated;

a display unit which displays pieces of application identification information corresponding to the plurality of applications respectively in a list format, in order that a user designates an application from the plurality of applications;

a setting unit which sets, for each of the plurality of applications, information indicating whether or not the wireless communication unit is to be activated while the application is executed, in response to an operation of the user; and a first display control unit which controls the display unit to display the application identification information by adding thereto, setting identification information, which corresponds to the information set by the setting unit for the application identified by the application identification information, when the display unit is to display the pieces of application identification information in a list format.

In the electronic apparatus, the pieces of application identification information may be different images which correspond to the plurality of applications respectively, the setting identification information may be an image which corresponds to information that the wireless communication unit is not to be activated, the setting unit may set, for at least one application, information that the wireless communication unit is not to be activated while the application is executed, and the first display control unit may control the display unit to display the image corresponding to the information that the wireless communication unit is not to be activated, by overlaying this image on the image corresponding to the application for which the setting unit sets the information that the wireless communication unit is not to be activated.

The electronic apparatus may further comprise:

a storage unit which stores, for each of the plurality of applications, information indicating whether or not each application is an application which includes a function executable even if the wireless communication unit is not activated, in association with each of the plurality of applications; and a second display control unit which controls the display unit to display the application identification information, in association with the information stored in association with the application identified by the application identification information in the storage unit, when the display unit is to display the pieces of application identification information in a list format, and the setting unit may set, for an application to which information indicating that the application is an application which includes a function executable even if the wireless communication unit is not activated is associated in the storage unit, information indicating whether or not the wireless communication unit is to be activated while the application is executed.

A computer-readable recording medium according to a second aspect of the present invention stores a program for controlling a computer having a plurality of applications to perform:

a setting step of setting, for each of the plurality of applications, information indicating whether or not a wireless communication process is allowed while the application is executed, in response to an operation of a user;

a displaying step of displaying pieces of application identification information corresponding to the plurality of applications respectively in a list format on a display unit, in order that the user designates an application from the plurality of applications; and a display controlling step of controlling the display unit to display the application identification information by adding thereto, setting identification information, which corresponds to the information set at the setting step for the application identified by the application identification information, when the pieces of application identification information are to be displayed in a list format at the displaying step.

An electronic apparatus according to a third aspect of the present invention is an electronic apparatus for executing a plurality of applications, and comprises:

a radio wave radiating unit which radiates a radio wave;

a setting storage unit which stores, in association with each of the plurality of applications, setting information indicating whether or not radio wave radiation by the radio wave radiating unit is to be prohibited while the application is executed;

a setting determination unit which determines, when an application is to be activated, whether or not the setting information stored in the setting storage unit in association with the application is setting information indicating that the radio wave radiation is to be prohibited; and a radio wave radiation control unit which prohibits the radio wave radiation while an application is executed, when the setting determination unit determines that the setting information stored in the setting storage unit in association with the application is setting information indicating that the radio wave radiation is to be prohibited.

The electronic apparatus may further comprise a power source unit which supplies power to the radio wave radiating unit, and the radio wave radiation control unit may prohibit the radio wave radiation, by stopping power supply from the power source unit to the radio wave radiating unit.

The electronic apparatus may further comprise:

a display unit which displays pieces of application identification information corresponding to the plurality of applications respectively, for identifying the plurality of applications; and a selection unit which selects an application to be activated, from the applications identified by the application identification information displayed by the display unit, in response to an operation of a user, and the setting determination unit may determine whether or not the setting information stored in the setting storage unit in association with the application selected by the selection unit is setting information indicating that the radio wave radiation is to be prohibited.

In the electronic apparatus, the display unit may display the application identification information of an application which is stored in association with the setting information indicating that the radio wave radiation is to be prohibited in the setting storage unit, by associating this application identification information with information indicating that the radio wave radiation is prohibited.

The electronic apparatus may further comprise a setting change unit which changes the setting information stored in the setting storage unit, in response to an operation of a user.

In the electronic apparatus, the setting storage unit may further store a period during which the radio wave radiation is to be prohibited, in association with an application associated with the setting information indicating that the radio wave radiation is to be prohibited, and when the setting determination unit determines that the setting information stored in the setting storage unit in association with an application is setting information indicating that the radio wave radiation is to be prohibited, the radio wave radiation control unit may prohibit the radio wave radiation during a period which is while the application is executed, and which is stored in the setting storage unit in association with the application.

A computer-readable recording medium according to a fourth aspect of the present invention stores a program for controlling a computer for executing a plurality of applications to perform:

a setting step of storing, in association with each of the plurality of applications, setting information indicating whether or not radio wave radiation is to be prohibited while the application is executed, in a storage unit;

an activating step of activating an application;

a setting determining step of determining whether or not the setting information stored in the storage unit in association with the application activated at the activating step is setting information indicating that the radio wave radiation is to be prohibited; and a radio wave radiation controlling step of prohibiting the radio wave radiation while an application is executed, when it is determined at the setting determining step that the setting information stored in the storage unit in association with the application is setting information indicating that the radio wave radiation is to be prohibited.

According to the present invention, the user can easily switch between the effective status and the ineffective status of the wireless communication function, application by application.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of the data structure of an application operation setting table according to the first embodiment of the present invention;

FIG. 4 is a diagram showing an example of the data structure of a sub-table;

FIG. 16 is a diagram showing an example of the data structure of an application operation setting table according to the second embodiment of the present invention;

FIG. 20 is a diagram showing an example of how a date designation menu is displayed in the detail setting process;

FIG. 21 is a diagram showing an example of how a time designation menu is displayed in the detail setting process.

DETAILED DESCRIPTION OF THE PREFERRED EMBODIMENTS

Embodiments of the present invention will be explained below with reference to the drawings. The embodiments to be shown below are preferred embodiments of the present invention. Accordingly, the present invention is not particularly limited to the embodiments shown below.

First Embodiment

First, the appearance of a mobile phone (portable phone, cellular phone) 1 according to the first embodiment of the present invention will be explained.

Figure 1:
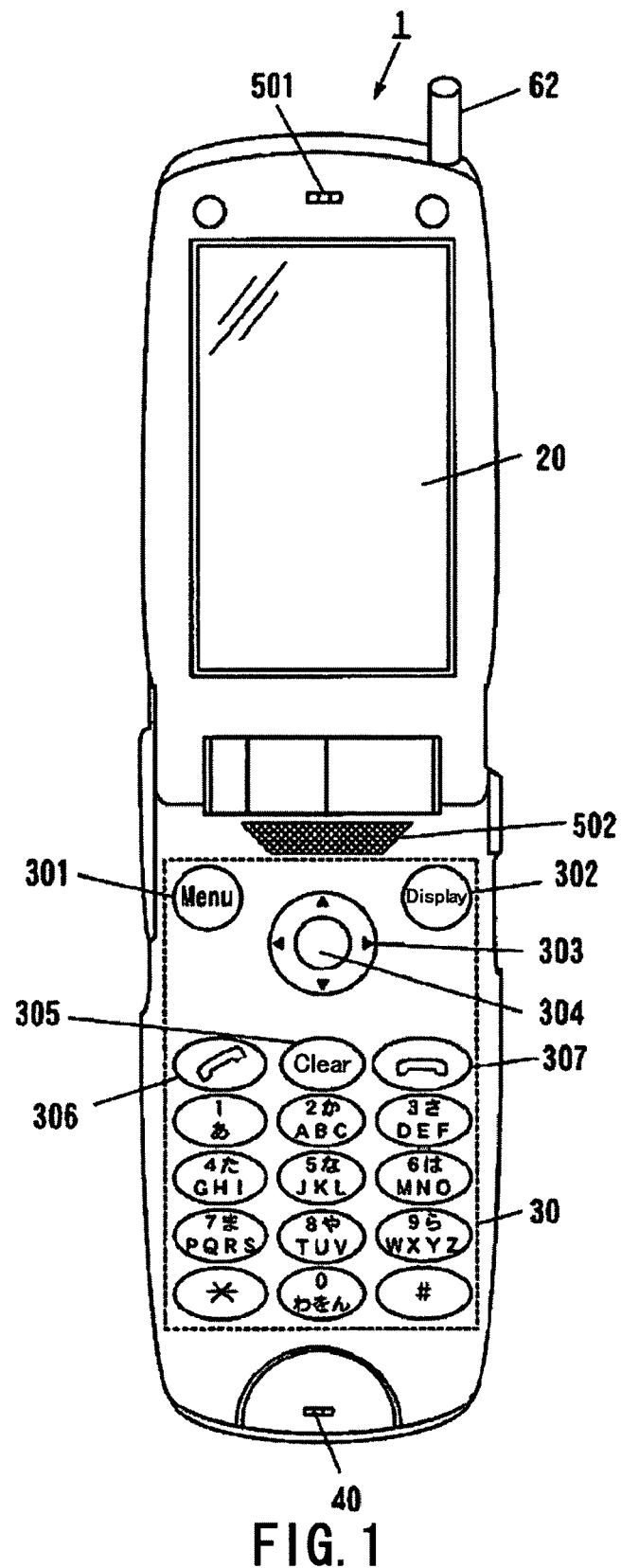
FIG. 1 is a diagram showing the appearance of a mobile phone according to the first embodiment of the present invention.

FIG. 1 is a diagram showing the appearance of the mobile phone 1.

As shown in FIG. 1, the mobile phone 1 comprises, on its appearance, a display section 20, a input section 30, a microphone 40, a phone call speaker 501, an alarm speaker 502, and a communication antenna 62.

The display section 20 is a display device for displaying various screens. The display section 20 comprises a backlight-inclusive color LCD (Liquid Crystal Display), an ELD (Electro Luminescence Display), or the like. The display section 20 displays various information for operating the mobile phone 1, information received by the mobile phone 1, etc.

The input section 30 is an input device which comprises a plurality of switches necessary for inputting various information. Specifically, the input section 30 comprises, in addition to number switches, a menu switch 301, a display switch 302, a cursor switch 303, a decision making switch 304, a clear switch 305, an off-hook switch 306, and an on-hook switch 307.

The number switches are associated with the numbers "0" to "9", kana characters (Japanese phonetic characters), and alphabets, respectively. The user switches the typing mode among the number mode, the kana mode, and the alphabet mode by a predetermined operation, and types in letters. For example, the number switch associated with "2" is associated with five kana characters with a consonant "k", and with the alphabetic letters "A" to "C". In the kana mode, any of the kana characters "ka", "ki", "ku", "ke", and "ko" is selected according to how many times the number switch is pressed. In the alphabet mode, any of the alphabetic letters "A", "B", and "C" is selected according to how many times the number switch is pressed.

The menu switch 301 is a switch for displaying various menu screens such as a main menu, sub menus, etc. The display switch 302 is a switch for displaying a screen for browsing e-mails, etc. The cursor switch 303 is a switch for the user to scroll the screen, select one piece of information from plural pieces of information displayed on the screen, etc. The cursor switch 303 can sense up, down, left, and right four directions. The decision making switch 304 is a switch for deciding on the selection, etc. made by the cursor switch 303. Various other functions than those described above can be assigned to the menu switch 301, the display switch 302, and the decision making switch 304.

For example, the user presses the menu switch 301 to bring up a menu screen on the display section 20. On the menu screen, symbolic icons corresponding to a plurality of functions (applications), and an operation cursor (selection cursor) for selecting any of the icons are displayed. The user operates the cursor switch 303 to move the operation cursor, and selects the icon corresponding to the function the user wants to start. When the user presses the decision making switch 304 with any icon selected, the function corresponding to the selected icon is activated in the mobile phone 1.

The clear switch 305 is a switch for clearing the content entered from the input section 30 or for bringing the display on the screen back to the closest previous display. The off-hook switch 306 is a switch for calling the phone number input from the input section 30, or for starting a phone talk when a communication arrives. The on-hook switch 307 is a switch for finishing a phone talk. The on-hook switch 307 also functions as a power switch of the mobile phone 1. When the on-hook switch 307 is kept pressed for a predetermined period (for example, three seconds), the power of the mobile phone 1 is switched between connection/disconnection (on/off).

The microphone 40 inputs the user's outgoing voices when a phone call is being made. The phone call speaker 501 outputs the incoming voices of the calling partner received when a phone call is being made. The alarm speaker 502 outputs a reception notifying sound for notifying the user of reception of any communication when a wireless communication arrives, or outputs an operation confirming sound for the user to be assured that his/her operations on the switches, etc. are effective. The communication antenna 62 sends (radiates) a radio wave to a wireless communication base station on a wireless communication network when making a wireless communication, and receives a radio wave from the wireless communication base station.

Next, the functional configuration of the mobile phone 1 will be explained. The same reference numerals will be given on the same components as those already explained, and explanation for such components will be omitted.

Figure 2:
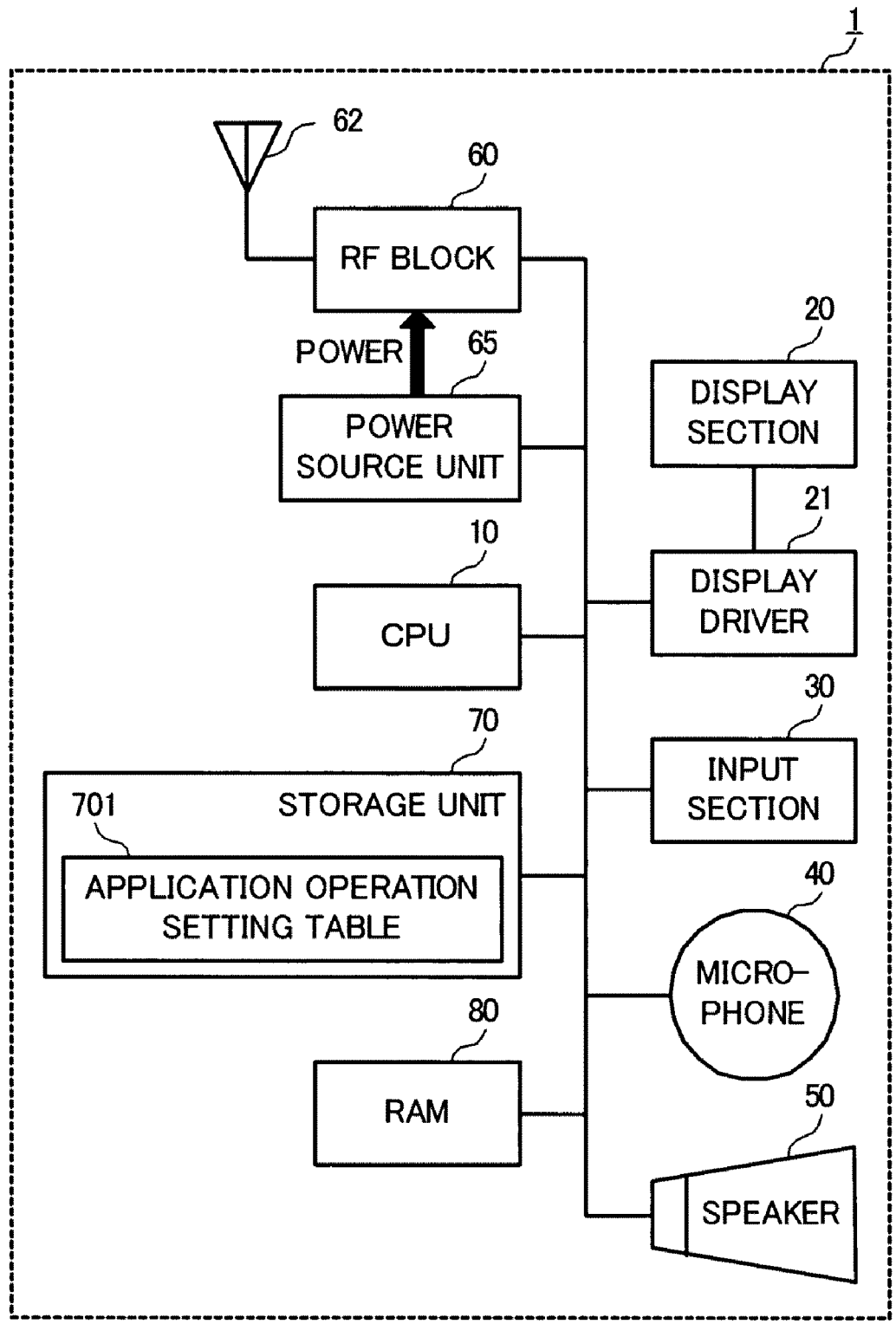
FIG. 2 is a block diagram exemplarily showing the functional configuration of the mobile phone of FIG. 1.

FIG. 2 is a block diagram exemplarily showing the functional configuration of the mobile phone 1.

As shown in FIG. 2, the mobile phone 1 comprises a CPU (Central Processing Unit) 10, the display section 20, a display driver 21, the input section 30, the microphone 40, a speaker 50, an RF (Radio Frequency) block 60, the communication antenna 62, a power source unit 65, a storage unit 70, and a RAM (Random Access Memory) 80. These components are connected to one another via a bus.

The CPU 10 performs processes based on predetermined programs to have control all across the mobile phone 1. For example, the CPU 10 gives operational instructions to the respective components comprised in the mobile phone 1 based on a program, thereby controlling the execution of each function possessed by the mobile phone 1, data input/output, etc.

Specifically, the CPU 10 reads out a program stored in the storage unit 70 in response to a depression signal input from the input section 30, and executes a process according to the program. Then, the CPU 10 outputs a display control signal for displaying the results of the process to the display driver 21, thereby displaying the result of the process according to the display control signal on the display section 20.

The CPU 101 operates based on a clock signal output from an oscillator (unillustrated) or the like, which outputs a constant frequency all the time. Further, the CPU 101 exerts a function of a clock or a timer, by measuring the time by counting the clock signal.

The display driver 21 controls the display section 20 based on a display control signal input from the CPU 10. Specifically, the display driver 21 controls the display section 20 to display various screens, by supplying an appropriate drive current corresponding to the display control signal to the display section 20.

The input section 30 outputs a depression signal of a switch depressed by the user for executing a program or for inputting various information, etc. to the CPU 10.

The microphone 40 comprises an unillustrated A/D (Analog/Digital) converter. The microphone 40 converts analog audio data (signal) representing outgoing voices of the user, etc., into digital audio data, by the A/D converter. The microphone 40 outputs the converted digital audio data to the RF block 60.

The speaker 50 comprises an unillustrated D/A (Digital/Analog) converter. The speaker 50 converts digital audio data representing incoming voices input from the RF block 60, a reception notifying sound, an operation confirming sound, etc. into analog audio data by the D/A converter. The speaker 50 outputs sounds based on the converted analog audio data. The speaker 50 is equivalent to the phone call speaker 501 and alarm speaker 502 shown in FIG. 1.

The RF block 60 is a circuit section that exerts a wireless communication function of the mobile phone 1 in cooperation with the CPU 10. The RF block 60 performs, by wireless communication, data transmission/reception for voice communication and data communication, based on an instruction from the CPU 10. Specifically, in transmitting data, the RF block 60 radiates a radio wave carrying modulated outgoing data, from the communication antenna 62. In receiving data, the RF block 60 demodulates a radio wave received by the communication antenna 62 and obtains incoming data. The wireless communication function allows the mobile phone 1 to perform voice communication or data communication with another mobile phone through a wireless communication base station.

The power source unit 65 supplies the respective component comprised in the mobile phone 1 including the RF block 60 with electricity required for driving the components.

The CPU 10 switches on/off the wireless communication function, by controlling the power supply from the power source unit 65 to the RF block 60. Specifically, to switch on the wireless communication function of the mobile phone 1, the CPU 10 controls the power source unit 65 to supply power to the RF block 60. Thereby, the RF block 60 is activated to be driven to bring the mobile phone 1 to a wireless communication function effective state. In order to switch off the wireless communication function of the mobile phone 1, the CPU 10 controls the power source unit 65 to stop supplying power to the RF block 60. Hence, the RF block 60 is not activated to be driven operate, so the mobile phone 1 is brought to a wireless communication function ineffective state. While the wireless communication function of the mobile phone 1 is switched on, even when neither voice communication nor data communication is performed, the mobile phone 1 radiates a radio wave from the communication antenna 62 to keep connection to a wireless communication base station.

The storage unit 70 comprises a magnetic storage medium, an optical storage medium, a non-volatile memory, or the like. The storage unit 70 stores a boot program, various application programs, various data, etc. The CPU 10 checks the hardware according to the boot program stored in the storage unit 70 when the mobile phone 1 is turned on, and loads default information and necessary programs. The respective functions of the mobile phone 1 are realized by the CPU 10 executing the application programs (application) stored in the storage unit 70. As the various data, the storage unit 70 stores data for the applications, for example, e-mails received, phone numbers, e-mail addresses, etc.

The storage unit 70 further stores an application operation setting table 701. The application operation setting table 701 stores setting information for controlling operations of each application.

FIG. 3 is a diagram showing an example of data structure of the application operation setting table 701.

As shown in FIG. 3, the application operation setting table 701 stores "application name", "icon display position", "sub-table number", "wireless communication function to be used or not to be used", "radio wave off setting flag", etc. in association with one another.

"Application name" indicates the name (function name) of an application for realizing a function possessed by the mobile phone 1.

"Icon display position" is information indicating the position on the screen where an icon (application icon), which is image information for identifying an application, is to be displayed. When the user is to select a desired application from a plurality of applications, an icon menu screen comprising a plurality of application icons is displayed on the display section 20. The icon menu screen has, for example, twelve display areas, made from the screen being divided into four rows vertically and three columns horizontally. A display position (x, y) indicates the position of a display area which exists at the x-th row from the top at the y-th column from the left on the icon menu screen. The application icon of each application is displayed on the position specified by the icon display position on the icon menu screen.

"Sub-table number" is an identification number of a sub-table linked to an application.

FIG. 4 is a diagram showing an example of data structure of a sub-table 701a.

An application stored in the application operation setting table 701 may include a plurality of sub-applications. In such a case, the sub-table 701a stores information regarding the sub-applications included in the application. A sub-application is a subordinate application attached to an application.

As shown in FIG. 4, the sub-table 701a stores, for each sub-table number, the sub-application name of an application associated with the sub-table number. Further, the sub-table

701a stores "wireless communication function to be used or not to be used", etc., for each sub-application.

Returning to FIG. 3, "wireless communication function to be used or not to be used" is information indicating whether or not an application involves the use of the wireless communication function. Specifically, in a case where an application can be executed with no use of the wireless communication function, "wireless communication function to be used or not to be used" is set to "not to be used". In a case where an application cannot be executed without the use of the wireless communication function, "wireless communication function to be used or not to be used" is set to "to be used".

Further, in a case where an application includes a plurality of sub-applications, "wireless communication function to be used or not to be used" is set based on the information stored in the sub-table 701a. Specifically, in a case where an application includes both a sub-application which uses the wireless communication function and a sub-application which does not use it, "wireless communication function to be used or not to be used" is set to "to be partially used". In a case where an application includes only sub-applications which use the wireless communication function, "wireless communication function to be used or not to be used" is set to "to be used". In a case where an application includes only sub-applications which do not use the wireless communication function, "wireless communication function to be used or not to be used" is set to "not to be used".

"Radio wave off setting flag" is a one-bit flag, which indicates setting information for setting off the wireless communication function while an application is executed. In other words, "radio wave off setting flag" is information indicating whether or not the RF block 60 is to be driven in parallel with execution of an application. That is, "radio wave off setting flag" is information indicating whether or not the RF block 60 is activated while an application is executed.

The mobile phone 1 sends or receives no radio wave while the wireless communication function is set off. Therefore, note that "wireless communication function off" may sometimes be referred to as "radio wave off" in the following explanation. The value of the "radio wave off setting flag" of an application which is set to the radio wave off state is set to "1". The value of the "radio wave off setting flag" of an application which is not set to the radio wave off state is set to "0". The value of the "radio wave off setting flag" initially takes "0", and is changed by a setting operation of the user. In a case where there is any application which the user wants to execute in the radio wave off state, the user sets such an application to the radio wave off state. Note that any application that necessarily uses the wireless communication function and for which "wireless communication function to be used or not to be used" is set to "to be used" cannot be set to the radio wave off state.

The application operation setting table 701 also stores a storage position (file path) of an application program or an address pointer which indicates a position from which an application program is read, when the application is to be read out, etc.

The storage unit 70 further stores icon data such as application icons, etc.

Returning to FIG. 2, the RAM 80 is a storage area for temporarily storing various programs executed by the CPU 10 and data used for the execution of these programs.

In the mobile phone 1 having the above-described configuration, the CPU 10 displays a screen on which the user can select an application, based on a screen display program.

The CPU 10 reads out the screen display program, information such as icon display positions stored in the application operation setting table 701, etc., from the storage unit 70, and stores them in the RAM 80 temporarily. The CPU 10 displays the images of the application icons at the positions specified by the icon display positions on the display section 20, by executing the screen display program. Thereby, an icon menu screen, which displays the list of applications, is displayed on the display section 20. Further, the CPU 10 displays the operation cursor on the icon menu screen. The user selects an application icon from the icon menu screen, by operating the input section 30. Then, when the CPU 10 detects a user's pressing on the decision making switch 304 while an application icon is being selected, the CPU 10 reads out a program specified by an application's file path or address pointer stored in the application operation setting table 701 from the storage unit 70, and executes the application corresponding to the selected application icon.

Figure 5:
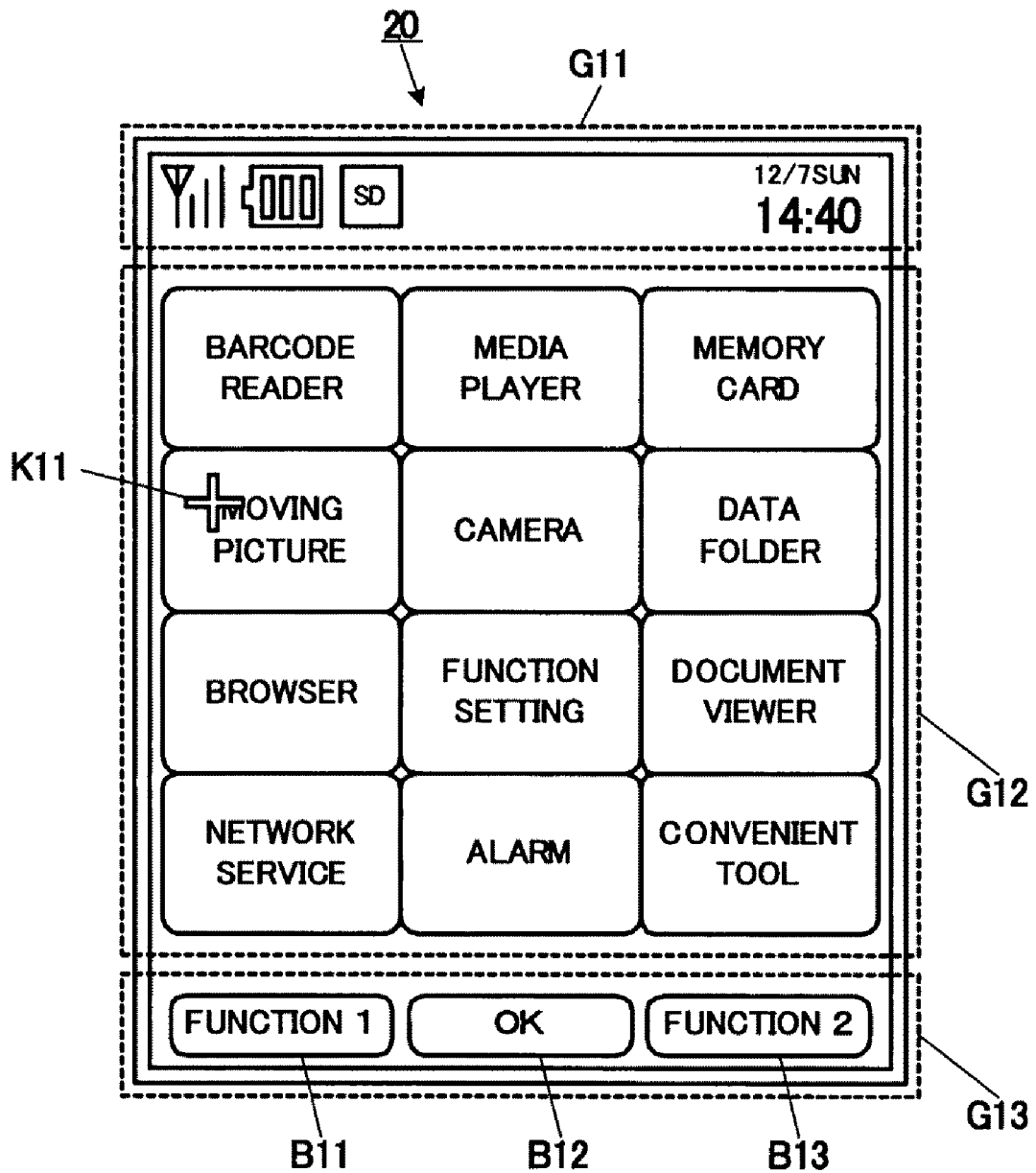
FIG. 5 is a diagram showing an example of a screen to be displayed on a display section.

FIG. 5 is a diagram showing an example of a screen displayed on the display section 20 when the screen display program is executed.

As shown in FIG. 5, the screen displayed on the display section 20 has a status display area G11 on the upper section of the screen, a main menu display area G12 on the middle section of the screen, and an operation menu display area G13 on the lower section of the screen. An antenna icon indicating the status of the wireless communication function, a battery remaining amount icon indicating the status of the power source, a connected device icon indicating a connection status of any optional device such as a memory card, and a clock, etc. are displayed on the status display area G11. An icon menu comprising a plurality of application icons, and an operation cursor K11 for the user to select any application icon are displayed on the main menu display area G12. Pieces of switch function information B11 to B13 are displayed on the operation menu display area G13. The switch function information B11 indicates a function to be executed when the menu switch 301 is pressed. The switch function information B12 indicates a function to be executed when the decision making switch 304 is pressed. The switch function information B13 indicates a function to be executed when the display switch 302 is pressed.

The user selects one application icon by the operation cursor K11 from the icon menu displayed on the main menu display are G12, and presses the decision making switch 304. With this operation, the user can cause his/her desired application to be executed on the mobile phone 1. The user can also check the status of the wireless communication function of the mobile phone 1 (whether the RF block 60 is being driven or not), the power source status, the connection status, time, etc. from the display on the status display area G11.

The mobile phone 1 may comprise a DSP (Digital Signal Processor) for processing image signals and audio signals. In this case, the CPU 10 and the DSP may be mounted on the same LSI (Large-Scale Integration) package to be integrated as one circuit. Further, the CPU 10 may realize the DSP functions by software, according to a program stored in the storage unit 70. A DSP is a processor for digital signal processing. Specifically, a DSP encodes audio signals and image signals and generates audio data and video data. Further, a DSP decodes encoded audio data and video data to obtain audio signals and video signals.

Next, a radio wave off setting process, in which the user makes radio wave off setting application by application, will be explained in detail.

Figure 6:
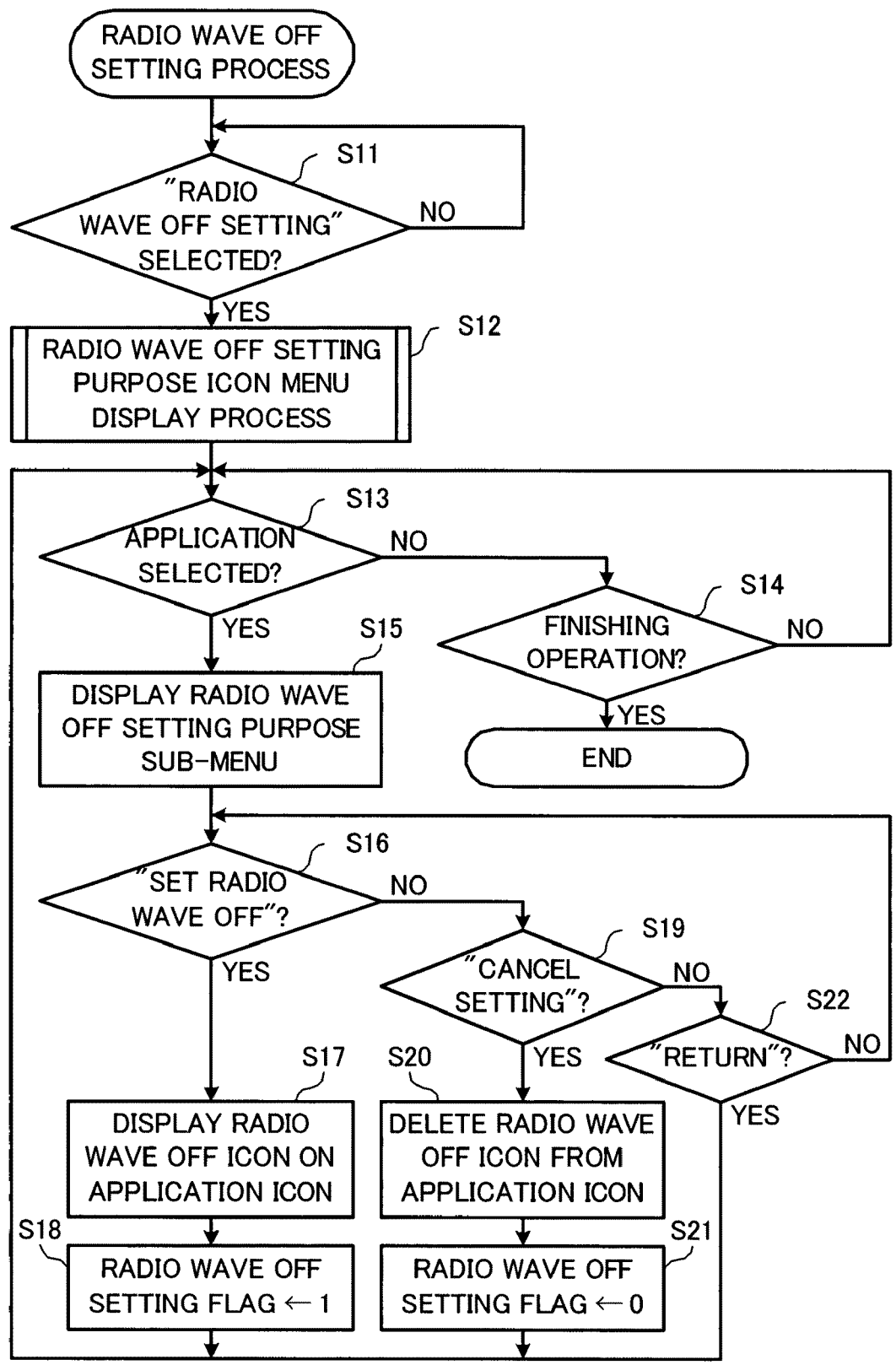
FIG. 6 is a flowchart showing a radio wave off setting process according to the first embodiment of the present invention.

FIG. 6 is a flowchart showing the radio wave off setting process.

This radio wave off setting process is performed by each component constituting the mobile phone 1 being controlled by the CPU 10.

This radio wave off setting process is started when, for example, a function setting icon is selected from the icon menu displayed on the main menu display area G12 shown in FIG. 5 and a function setting menu for setting various functions is displayed on the display section 20.

The CPU 10 first detects any operation of the user on the input section 30, and determines whether or not "radio wave off setting" is selected from the function setting menu (step S11).

In a case where "radio wave off setting" is not selected from the function setting menu (step S11: NO), the CPU 10 waits until "radio wave off setting" is selected.

When "radio wave off setting" is selected from the function setting menu (step S11: YES), the CPU 10 performs a radio wave off setting purpose icon menu display process (step S12).

Figure 7:
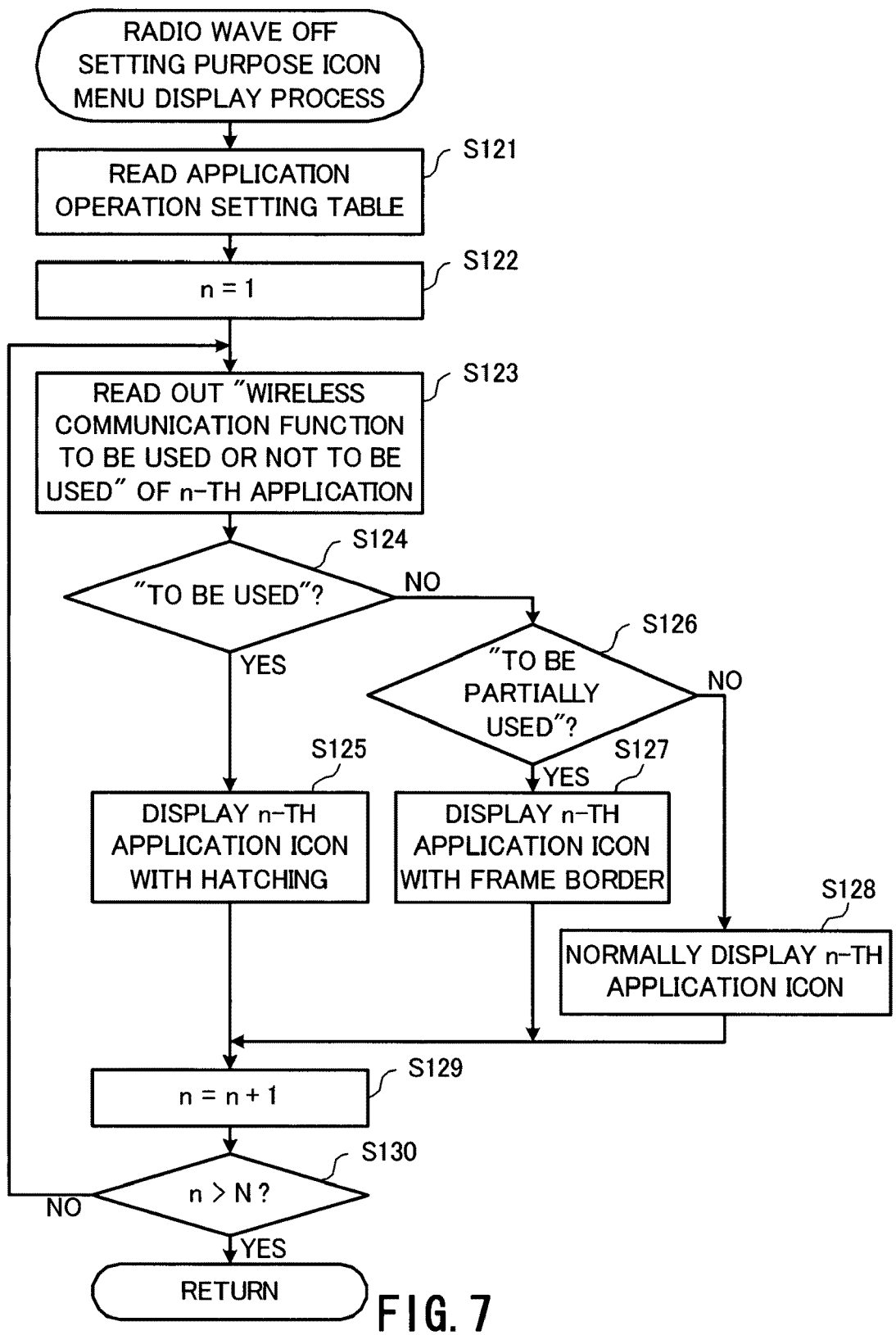
FIG. 7 is a flowchart showing a radio wave off setting purpose icon menu display process in FIG. 6.

FIG. 7 is a flowchart showing the radio wave off setting purpose icon menu display process of step S12.

In this radio wave off setting purpose icon menu display process, the application icons are displayed on the main menu display area G12 in a form corresponding to "wireless communication function to be used or not to be used" stored in the application operation setting table 701.

First, the CPU 10 reads the application operation setting table 701 stored in the storage unit 70 into the RAM 80 (step S121).

Then, the CPU 10 performs a loop process N times, in order to sequentially display N number of application icons, which correspond to N number of applications stored in the application operation setting table 701, on the main menu display area G12.

First, the CPU 10 assigns 1 to a variable n (step S122).

Next, the CPU 10 reads out "wireless communication function to be used or not to be used" of an application stored at the n-th order in the application operation setting table 701 (hereinafter referred to as n-th application) (step S123).

Then, the CPU 10 determines whether or not the read-out "wireless communication function to be used or not to be used" is "to be used" (step S124).

In a case where it is determined that "wireless communication function to be used or not to be used" is "to be used" (step S124: YES), the CPU 10 displays the application icon corresponding to the n-th application on the main menu display area G12 with hatching applied to the icon (step S125).

In a case where it is determined at step S124 that "wireless communication function to be used or not to be used" is not "to be used" (step S124: NO), the CPU 10 determines whether or not "wireless communication function to be used or not to be used" is "to be partially used" (step S126).

In a case where it is determined that "wireless communication function to be used or not to be used" is "to be partially used" (step S126: YES), the CPU 10 displays the application icon corresponding to the n-th application on the main menu display area G12 with a frame border applied to the icon (step S127).

In a case where it is determined at step S126 that "wireless communication function to be used or not to be used" is not "to be partially used" (step S126: NO), the CPU 10 displays the icon corresponding to the n-th application on the main menu display area G12 in the normal display manner (step S128).

In the process at step S125, S127, or S128, the CPU 10 reads out the application icon data of the n-th application from the storage unit 70, and displays the application icon at the "icon display position" of the n-th application stored in the application operation setting table 701.

After the process at step S125, S127, or S128, the CPU 10 increments the variable n by 1 (step S129), and determines whether or not n>N (step S130).

In a case where it is not n>N (step S130: NO), the flow returns to step S123 and the CPU 10 repeats the processes at step S123 to S129 for the applications whose application icon has not yet been displayed on the main menu display area G12.

Then, when it becomes n>N (step S130: YES), the CPU 10 terminates this radio wave off setting purpose icon menu display process and returns the flow to the radio wave off setting process of FIG. 6.

By the loop process being performed N times in this manner, an icon menu, which comprises application icons corresponding to all of the N number of applications stored in the application operation setting table 701, is displayed on the main menu display area G12.

Figure 8:
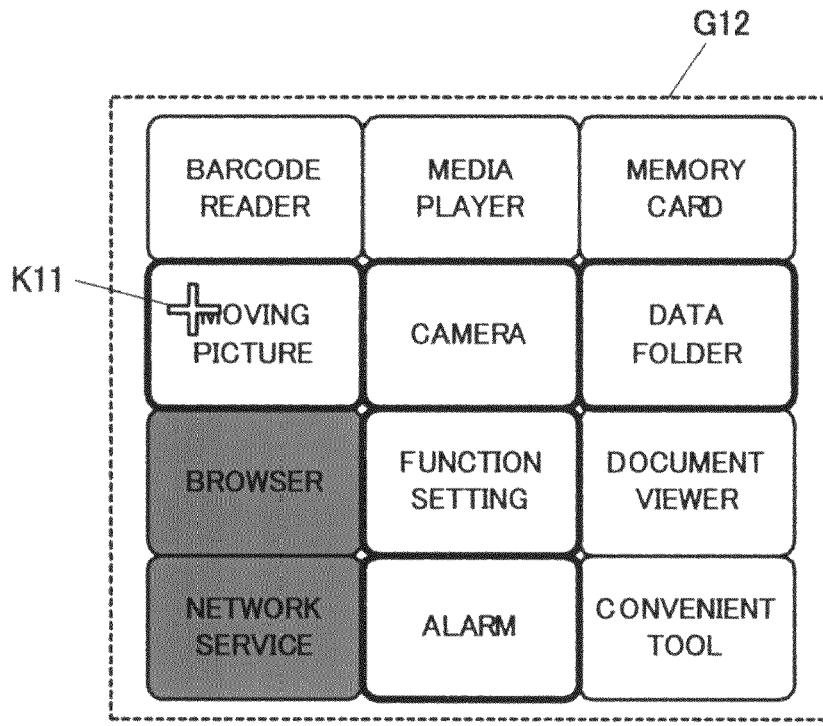
FIG. 8 is a diagram showing an example of a screen to be displayed on a main menu display area by the radio wave off setting purpose icon menu display process.

FIG. 8 is a diagram showing an example of a screen to be displayed on the main menu display area G12 by the radio wave off setting purpose icon menu display process.

By the radio wave off setting purpose icon menu display process being performed, a radio wave off setting purpose icon menu is displayed on the main menu display area G12. Specifically, as shown in FIG. 8, the application icons are displayed on the radio wave off setting purpose icon menu, with their display modes differentiated among the applications that use the wireless communication function, the applications that include sub-applications which use the wireless communication function, and the applications that do not use the wireless communication function.

In the example of data in the application operation setting table 701 shown in FIG. 3, the applications that use the wireless communication function are browser and network service. Therefore, their application icons are displayed with hatching in the icon menu.

The applications that include sub-applications which use the wireless communication function are moving picture, camera, data folder, function setting, and alarm. Therefore, their application icons are highlighted with frame borders in the icon menu.

The applications that do not use the wireless communication function are barcode reader, media player, memory card, document viewer, and convenient tool. Therefore, their application icons are displayed in the normal display manner with no decoration in the icon menu.

It is enough if the display modes of the application icons according to "wireless communication function to be used or not to be used" can enable the user to recognize whether the wireless communication function is to be used or not to be used for each application. Therefore, the application icons may be displayed in other display modes than display with hatching and display with a frame border.

The CPU 10 controls the application icons displayed with hatching, such that the user cannot select them. For example, when the operation cursor K11 is on an application icon displayed with hatching, the CPU 10 makes any operation on the decision making switch 304 ineffective. This makes it possible to prevent the user from setting radio wave off for any application that indispensably uses the wireless communication function.

Returning to FIG. 6, when the radio wave off setting purpose icon menu is displayed on the display section 20 by the radio wave off setting purpose icon menu display process (step S12), the CPU 10 detects any operation of the user on the input section 30 to determine whether or not one application is selected from the icon menu (step S13). Specifically, an application corresponding to an application icon is selected by the user using the operation cursor K11 and selecting one application icon from the plurality of application icons in the icon menu.

When no application is selected (step S13: NO), the CPU 10 detects any operation of the user on the input section 30 to determine whether or not an operation to finish the radio wave off setting process is given (step S14). This finishing operation is given by, for example, the user pressing the menu switch 301 or the display switch 302, to which a finishing function is assigned.

In a case where no operation to finish the radio wave off setting process is given (step S14: NO), the flow returns to step S13 and the CPU 10 waits until any application icon is selected or an operation to finish the radio wave off setting process is given. To the contrary, in a case where an operation to finish the radio wave off setting process is give (step S14: YES), the CPU 10 terminates this radio wave off setting process.

In a case where it is determined at step S13 that any application is selected (step S13: YES), the CPU 10 pops up and displays a radio wave off setting purpose sub-menu on the main menu display area G12 of the display section 20, in order that the selected application may be set to radio wave off (step S15).

Figure 9:
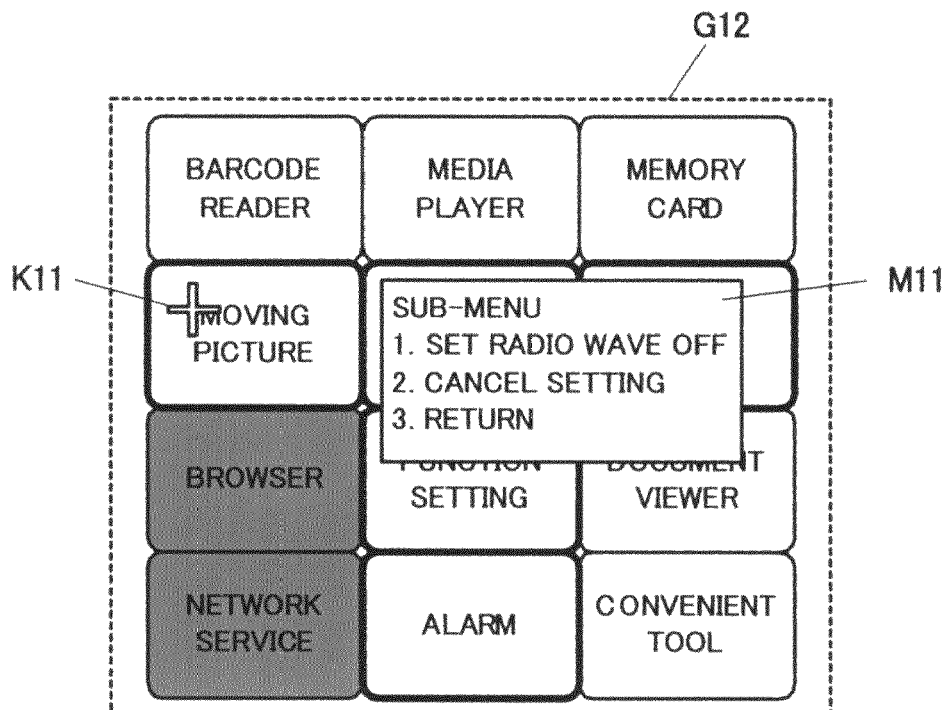
FIG. 9 is a diagram showing an example of how a sub-menu is displayed in the radio wave off setting process.

FIG. 9 is a diagram showing an example of how a radio wave off setting purpose sub-menu M11 is displayed.

As shown in FIG. 9, the radio wave off setting purpose sub-menu M11 is popped up on the icon menu. The radio wave off setting purpose sub-menu M11 comprises items of "set radio wave off", "cancel setting", and "return". "Set radio wave off" is an item for setting the application selected at step S13 to the radio wave off state. "Cancel setting" is an item for cancel the radio wave off setting of an application that has already been set to the radio wave off state. "Return" is an item for closing the radio wave off setting purpose sub-menu M11 and returning to the radio wave off setting purpose icon menu for selecting an application.

Returning to FIG. 6, when the radio wave off setting purpose sub-menu M11 is displayed at step S15, the CPU 10 detects any operation of the user on the input section 30 to determine whether or not "set radio wave off" is selected from the radio wave off setting purpose sub-menu M11 (step S16). In other words, the CPU 10 determines whether or not the application selected at step S13 is set to the radio wave off state.

In a case where "set radio wave off" is selected (step S16: YES), the CPU 10 additionally displays a radio wave off icon, which indicates that the application concerned is set to the radio wave off state, on the application icon corresponding to the application selected at step S13 (step S17). Specifically, the CPU 10 reads out the image information of the radio wave off icon from the storage unit 70, and displays the radio wave off icon by imposing it on the application icon.

Figure 10:
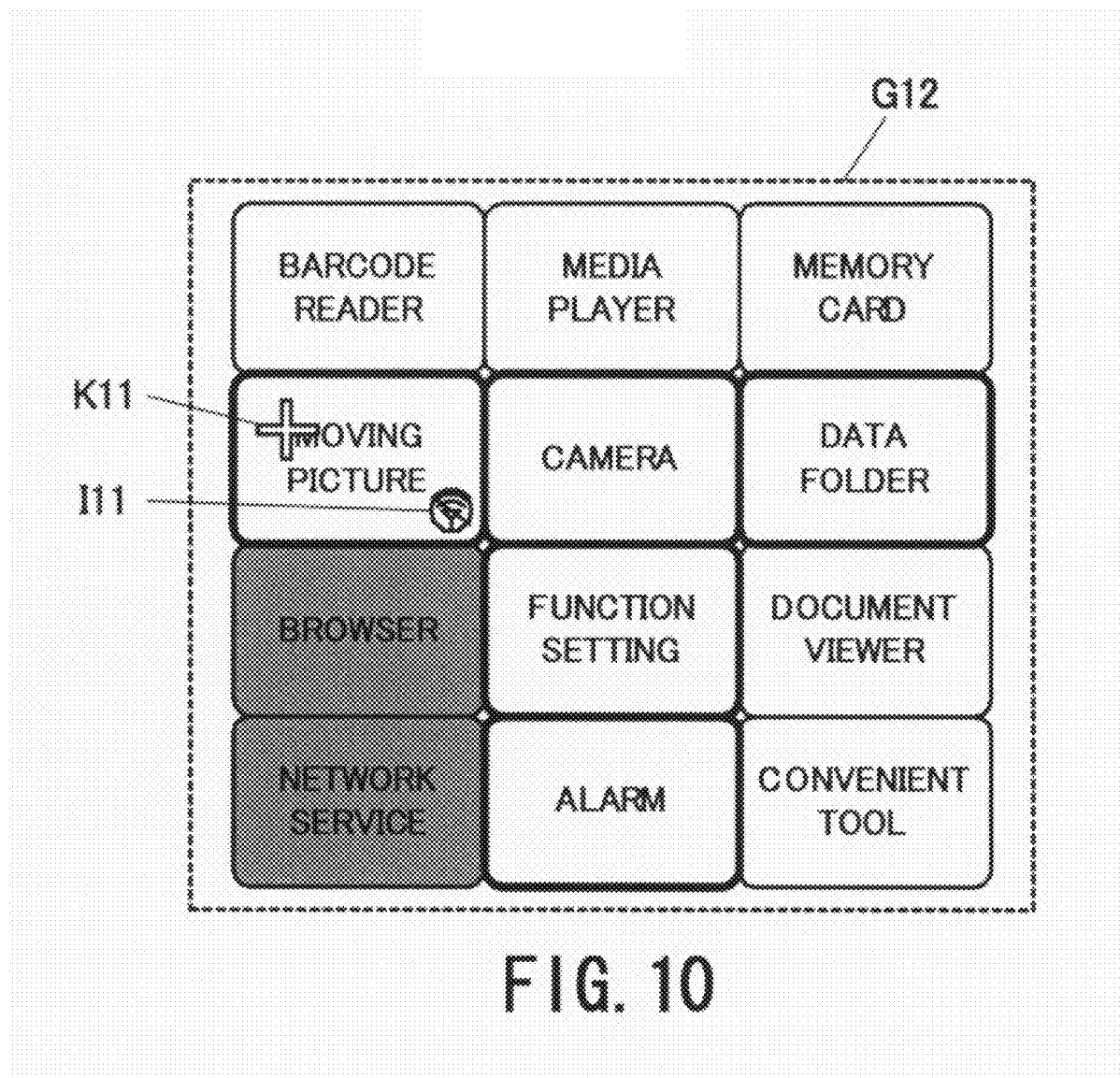
FIG. 10 is a diagram showing an example of how a radio wave off icon is displayed in the radio wave off setting process.

FIG. 10 is a diagram showing an example of how the radio wave off icon I11 is displayed.

When the application selected at step S13 is set to the radio wave off state, the radio wave off icon I11 is displayed while overlaid on the application icon selected by the operation cursor K11, as shown in FIG. 10. The radio wave off icon I11 is image information indicating that the RF block 60 is not to be activated while the application concerned is being executed.

Returning to FIG. 6, after displaying the radio wave off icon I11, the CPU 10 sets the value of the radio wave off setting flag of the application selected at step S13, that is in the application operation setting table 701, to "1" (step S18). Then, the flow returns to step S13, so that radio wave off setting may be performed for other applications.

In a case where it is determined at step S16 that "set radio wave off" is not selected (step S16: NO), the CPU 10 determines whether or not "cancel setting" is selected from the radio wave off setting purpose sub-menu M11 (step S19).

In a case where "cancel setting" is selected (step S19: YES), the CPU 10 deletes the radio wave off icon I11, which is additionally displayed on the application icon corresponding to the application selected at step S13 (step S20).

Then, the CPU 10 sets the value of the radio wave off setting flag of the application selected at step S13, that is in the application operation setting table 701, to "0" (step S21). Then, the flow returns to step S13.

In a case where it is determined at step S19 that "cancel setting" is not selected (step S19: NO), the CPU 10 determines whether or not "return" is selected from the radio wave off setting purpose sub-menu M11 (step S22).

In a case where "return" is selected (step S22: YES), the CPU 10 closes the radio wave off setting purpose sub-menu M11 to return the screen to the icon menu, and returns the flow to step S13.

To the contrary, in a case where it is determined that "return" is not selected (step S22: NO), the CPU 10 returns the flow to step S16, and waits until any item is selected from the radio wave off setting purpose sub-menu M11.

In the above-described radio wave off setting process, the mobile phone 1 displays the icon menu as a list of applications on the main menu display area G12 of the display section 20. Then, the mobile phone 1 performs a process for setting the radio wave off state and a process for canceling the setting, for the application that is selected by the user from the icon menu.

Accordingly, in this radio wave off setting process, the user can easily set or cancel the radio wave off state, for each application possessed by the mobile phone 1.

Further, the mobile phone 1 displays the icon indicating that the radio wave off state is set, by overlaying it on the icon which specifies the application that is set to the radio wave off state.

Accordingly, the user can easily confirm the application, which is set to the radio wave off state in the radio wave off setting process.

Further, the mobile phone 1 records, application by application, whether the application is one that is to be executed with the use of the wireless communication function, and displays an icon specifying the application in the icon menu, in a mode corresponding to "wireless communication function to be used or not to be used".

Accordingly, when performing the radio wave off setting, the user can easily determine whether or not each application should be set to the radio wave off state, based on the difference of the display modes of the application icons in the icon menu.

Next, an application activating process, which is to be performed by the mobile phone 1, which has any application set to the radio wave off state in the above-described radio wave off setting process, will be explained.

Figure 11:
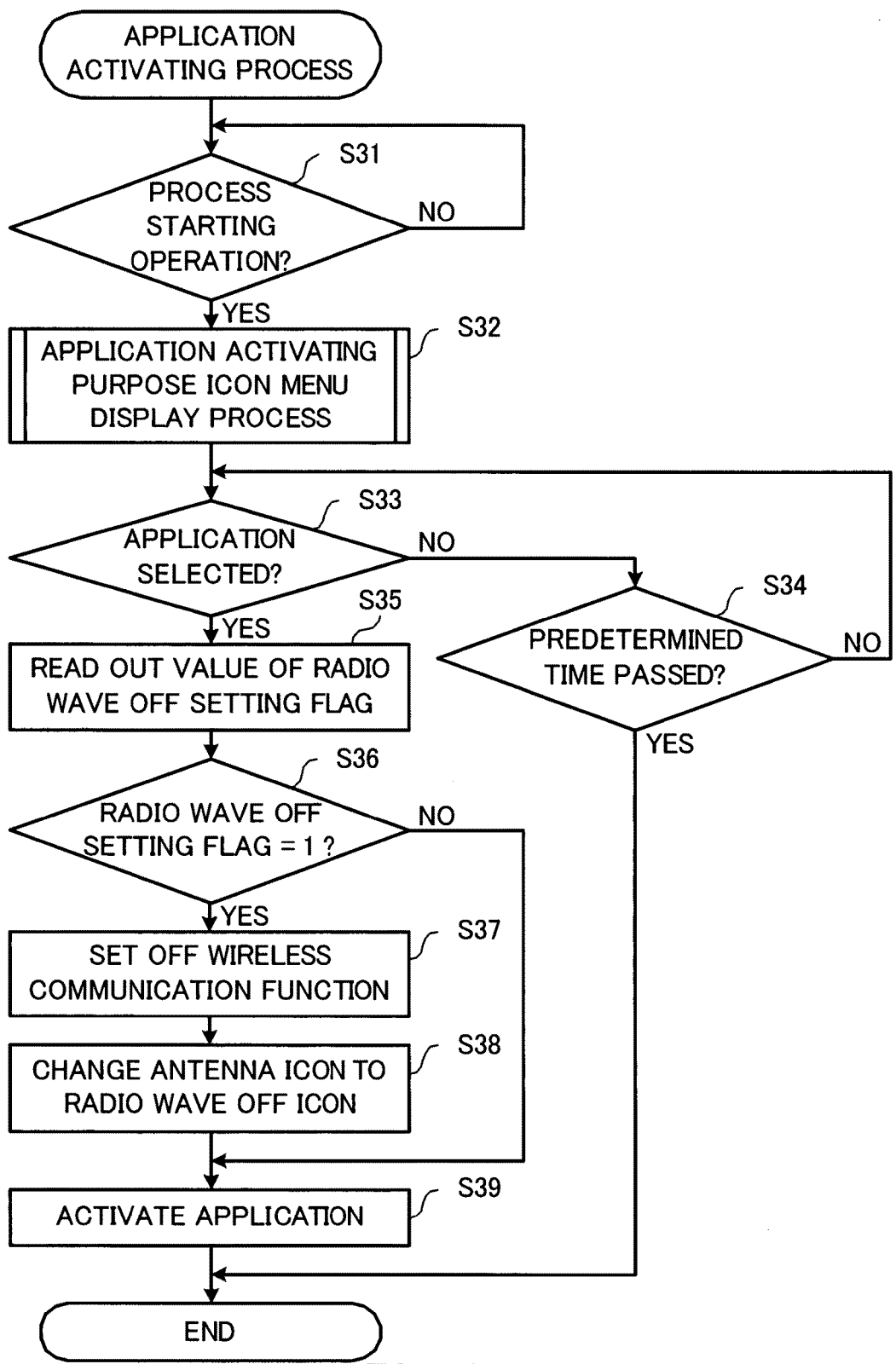
FIG. 11 is a flowchart showing an application activating process according to the first embodiment of the present invention.

FIG. 11 is a flowchart showing the application activating process.

This application activating process is performed when, for example, the mobile hone 1 is in a standby state, in which the wireless communication function is effective (on).

This application activating process is performed by each component constituting the mobile phone 1 being controlled by the CPU 10.

First, the CPU 10 detects any operation of the user on the input section 30 to determine whether or not an operation to start the application activating process is given (step S31).

In a case where this operation is not given (step S31: NO), the CPU 10 waits until a process starting operation is given.

When an operation to start the application activating process is given (step S31: YES), the CPU 10 displays an application activating purpose icon menu on the main menu display area G12 of the display section 20 (step S32).

Figure 12:
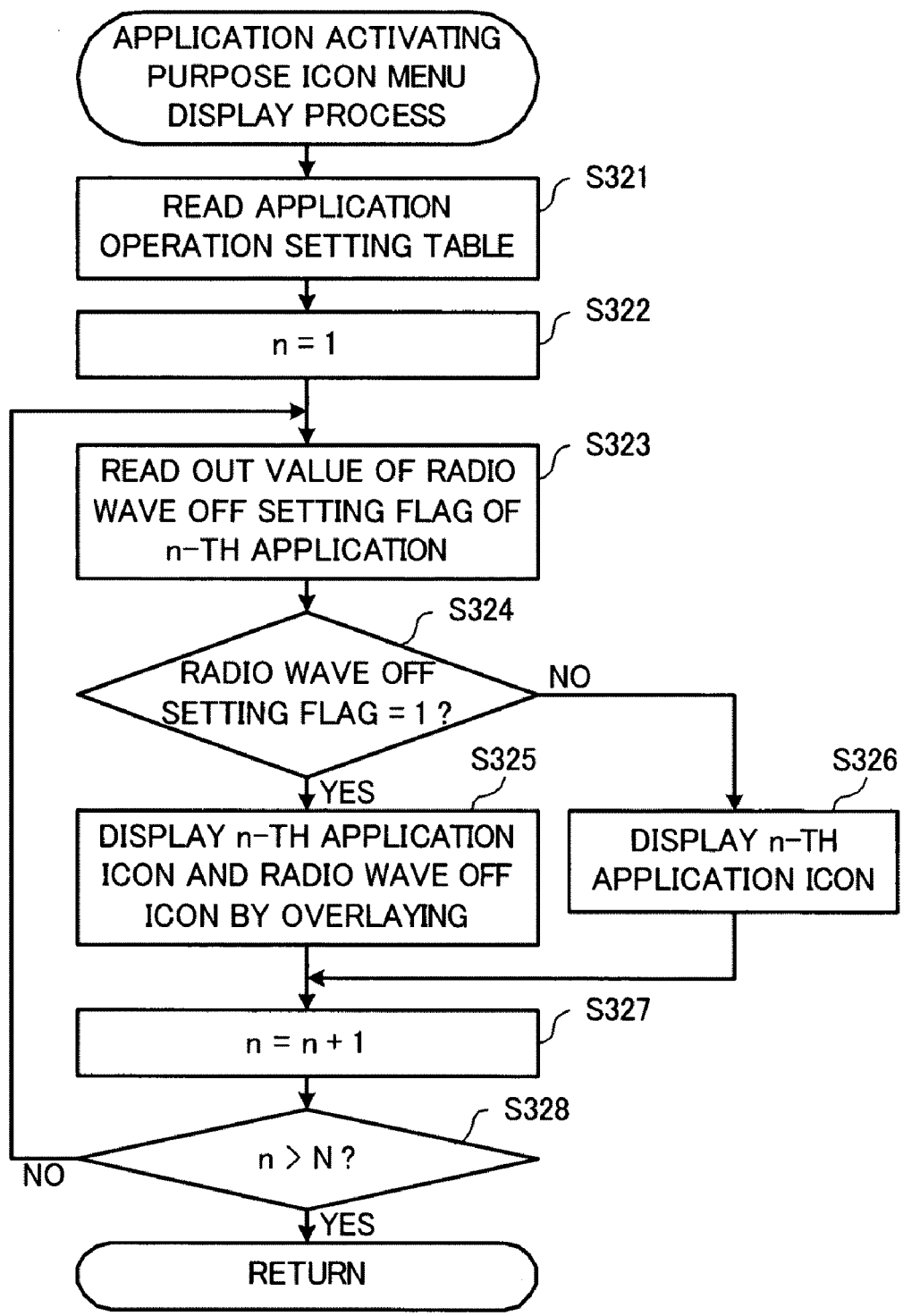
FIG. 12 is a flowchart showing an application activating purpose icon menu display process in FIG. 11.

FIG. 12 is a flowchart showing an application activating purpose icon menu display process.

This application activating purpose icon menu display process is a process in which the application icons are to be displayed on the main menu display area G12, in modes corresponding to the values of the radio wave off setting flag stored in the application operation setting table 701.

First, the CPU 10 reads the application operation setting table 701 stored in the storage unit 70 into the RAM 80 (step S321).

Next, the CPU 10 assigns 1 to a variable n (step S322).

Then, the CPU 10 reads out the value of the radio wave off setting flag of the n-th application in the application operation setting table 701 (step S323).

Next, the CPU 10 determines whether or not the value of the read-out radio wave off setting flag is "1" (step S324).

In a case where the value of the radio wave off setting flag is "1" (step S324: YES), the CPU 10 displays the application icon of the n-th application and the radio wave off icon I11 on the display section 20 by overlaying them (step S325).

Specifically, the CPU 10 reads out image information of the application icon of the n-th application and image information of the radio wave off icon I11 from the storage unit 70. Further, the CPU 10 reads out the information of "icon display position" of the n-th application stored in the application operation setting table 701. Then, the CPU 10 displays the image of the application icon on which the radio wave off icon I11 is imposed, at the position specified by the icon display position in the main menu display area G12.

To the contrary, in a case where the value of the radio wave off setting flag is not "1" (step S324: NO), the CPU 10 displays the application icon of the n-th application on the display section 20 with no special treatment (step S326). That is, in a case where the value of the radio wave off setting flag is "0" or in a case where no radio wave off setting flag is set, the radio wave off icon I11 is not displayed on the application icon of the n-th application.

Specifically, the CPU 10 reads out image information of the application icon of the n-th application from the storage unit 70. Further, the CPU 10 reads out the information of "icon display position" of the n-th application stored in the application operation setting table 701. Then, the CPU 10 displays the application icon at the position specified by the icon display position in the main menu display area G12.

After the process at step S325 or step S326, the CPU 10 increments the variable n by 1 (step S327), and determines whether or not n>N (step S328).

In a case where it is not n>N (step S328: NO), the flow returns to step S323 and the CPU 10 repeats the processes at step S323 to S327, for the applications whose application icon has not yet been displayed on the main menu display area G12.

Then, when it becomes n>N (step S328: YES), the CPU 10 terminates this application activating purpose icon menu display process and returns the flow to the application activating process of FIG. 11.

By this loop process being performed N times in this manner, an icon menu, which comprises application icons corresponding to all of the N number of applications stored in the application operation setting table 701, is displayed on the main menu display area G12.

Figure 13:
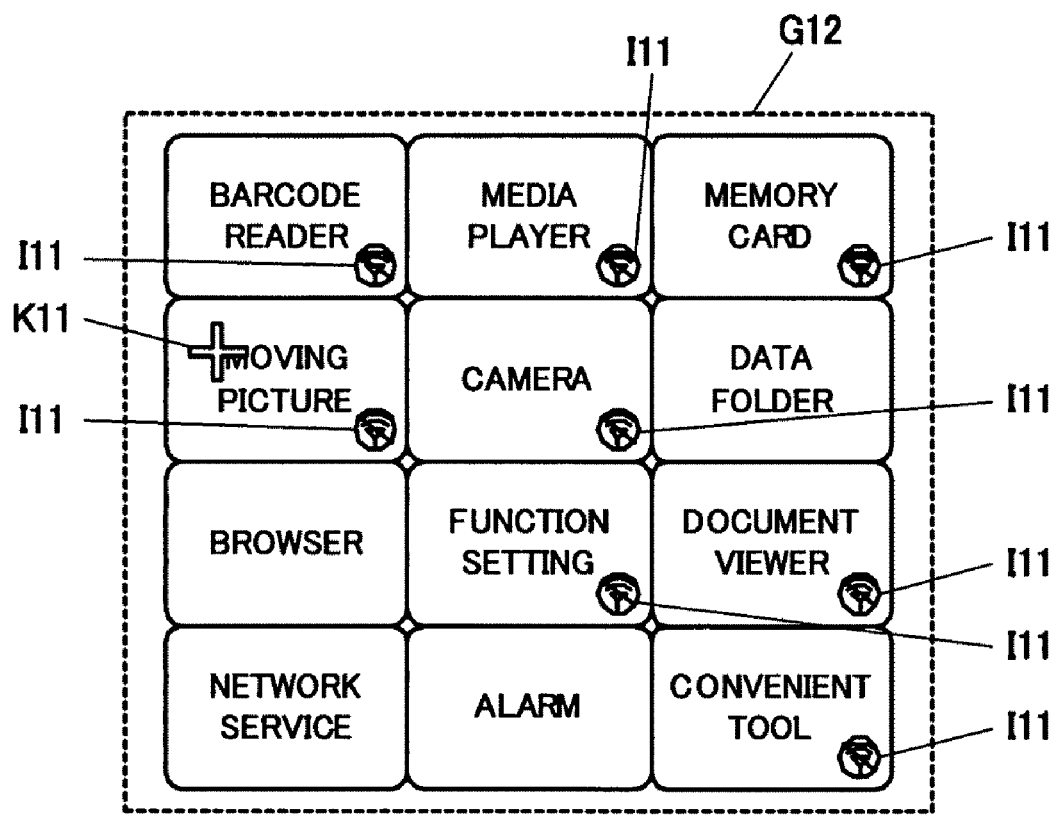
FIG. 13 is a diagram showing an example of a screen to be displayed on the main menu display area by the application activating purpose icon menu display process.

FIG. 13 is a diagram showing an example of a screen to be displayed on the main menu display area G12 by the application activating purpose icon menu display process.

By the application activating purpose icon menu display process being performed, an application activating purpose icon menu is displayed on the main menu display area G12. Specifically, as shown in FIG. 13, the application icons are displayed on the application activating purpose icon menu, with their display modes differentiated between the applications which are set to the radio wave off state, and the applications which are not set to the radio wave off state.

In the example of the data in the application operation setting table 701 shown in FIG. 3, the applications whose radio wave off setting flag takes the value "1" are "barcode reader", "media player", "memory card", "moving picture", "camera", "function setting", "document viewer", and "convenient tool". Therefore, their application icons are displayed on the main menu display area G12, with the radio wave off icon I11 imposed.

Returning to FIG. 11, when the application activating purpose icon menu is displayed on the display section 20 by the application activating purpose icon menu display process (step S32), the CPU 10 detects any operation of the user on the input section 30 to determine whether or not one application is selected from the icon menu (step S33). Specifically, an application-corresponding to an application icon is selected by the user using the operation cursor K11 and selecting one application icon from the plurality of application icons in the icon menu.

In a case where no application is selected (step S33: NO), the CPU 10 determines whether or not a predetermined time has passed after the icon menu is displayed (step S34).

In a case where the predetermined time has not passed (step S34: NO), the flow returns to step S33 and the CPU 10 continues determining whether or not any application is selected, until the predetermined time has passed.

In a case where the predetermined time has passed before any application is selected (step S34: YES), the CPU 10 terminates this application activating process.

In a case where it is determined at step S33 that any application is selected (step S33: YES), the CPU 10 reads out the value of the radio wave off setting flag of the selected application from the application operation setting table 701 (step S35).

Next, the CPU 10 determines whether or not the value of the read-out radio wave off setting flag is "1" (step S36).

In a case where the value of the radio wave off setting flag is "1", i.e., in a case where the application is set to the radio wave off state (step S36: YES), the CPU 10 sets the wireless communication function of the mobile phone 1 off (ineffective) (step S37). Specifically, the CPU 10 stops the power supply from the power source unit 65 to the RF lock 60.

Then, the CPU 10 changes the antenna icon displayed on the status display area G11 to the radio wave off icon (step S38).

Then, the CPU 10 activates the selected application (step S39), and terminates this application activating process.

To the contrary, in a case where it is determined at step S36 that the value of the radio wave off setting flag is not "1" (step S36: NO), the CPU 10 skips steps S37 and S38, activates the selected application (step S39), and terminates this application activating process.

Figure 14A:
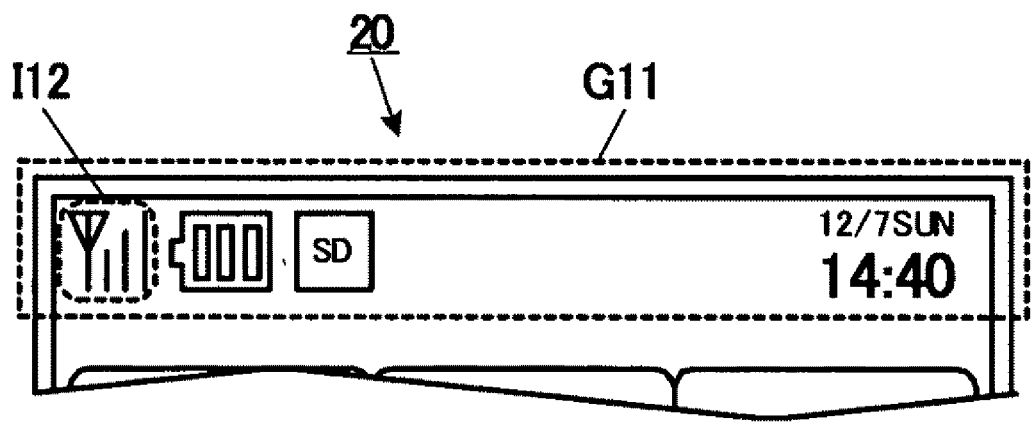
FIG. 14A is a diagram showing an example of a screen to be displayed on a status display area while a wireless communication function is being effective.
Figure 14B:
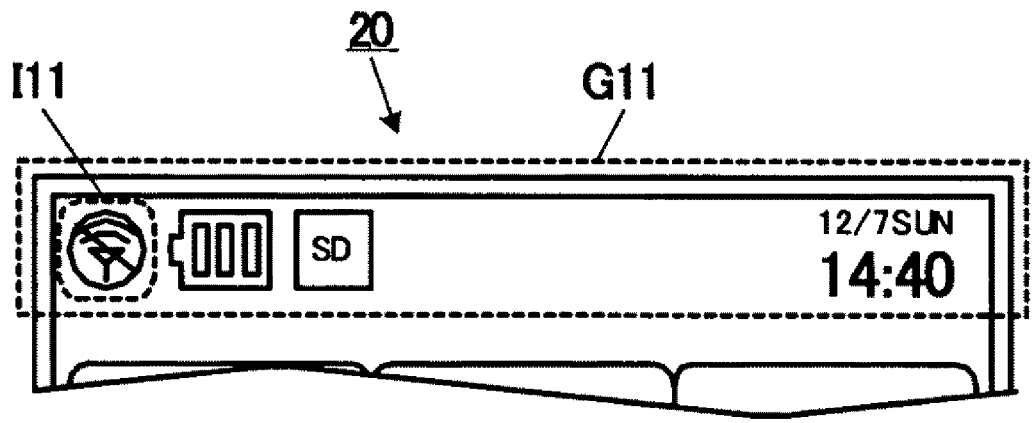
FIG. 14B is a diagram showing an example of a screen to be displayed on the status display area while the wireless communication function is being ineffective.

FIG. 14A is a diagram showing an example of a screen to be displayed on the status display area GI1 when the wireless communication function is being effective, and FIG. 14B is a diagram showing an example of a screen to be displayed on the status display area GI1 when the wireless communication function is being ineffective.

Before the process at the above-described step S38, an antenna icon I12, which is indicative of the status that the wireless communication function is being on (effective) and the intensity of received radio waves, is displayed on the status display area G11 of the display section 20, as shown in FIG. 14A. On the other hand, after the process at step S38, the antenna icon I12 shown in FIG. 14A is displayed as changed to the radio wave off icon I11, which indicates that the wireless communication function is being off (ineffective), as shown in FIG. 14B.

By the above-described application activating process, the mobile phone 1 displays the application activating purpose icon menu on the display section 20, when any application is to be activated. The user can easily know which applications will set the wireless communication function off, when to be executed, from this application activating purpose icon menu. Then, the user can select any application that he/she wants to be activated, by checking the radio wave off icons in the application activating purpose icon menu. Further, the mobile phone 1 can simultaneously set the wireless communication function ineffective, when activating any application that is set to the radio wave off state.

Next, an application finishing process for finishing an application which is operating in the mobile phone 1 by the application activating process will be explained.

Figure 15:
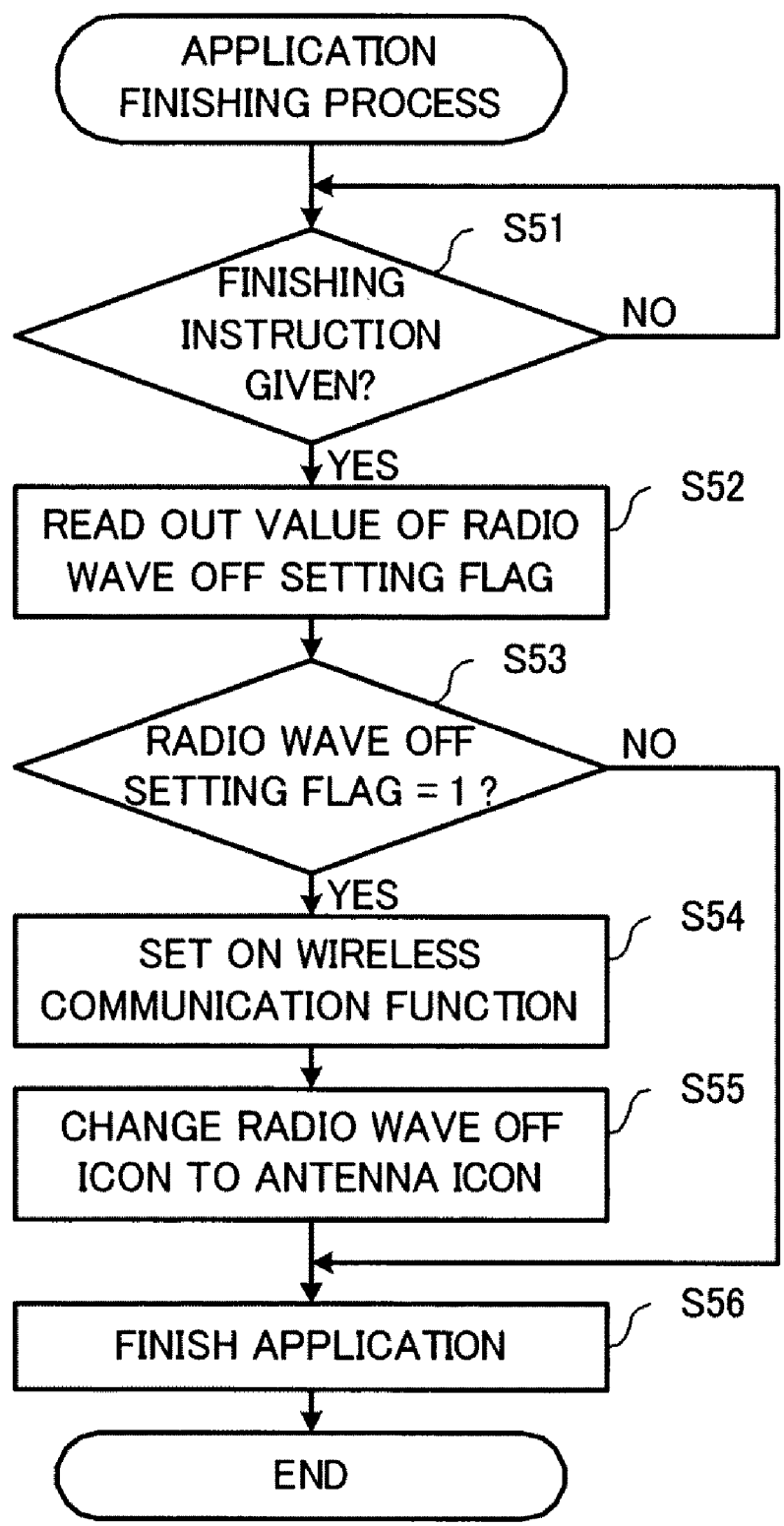
FIG. 15 is a flowchart showing an application finishing process according to the first embodiment of the present invention.

FIG. 15 is a flowchart showing the application finishing process.

As shown in FIG. 15, the CPU 10 determines whether or not an instruction to finish the application, which is operating, is given, in response to any operation of the user on the input section 30 (step S51).

In a case where no instruction to finish the application is given (step S51: NO), the CPU 10 waits until an instruction to finish the application is given.

When an instruction to finish the application is given (step S51: YES), the CPU 10 reads out the value of the radio wave off setting flag of the application to which the finishing instruction is given from the application operation setting table 701 (step S52).

Next, the CPU 10 determines whether or not the value of the read-out radio wave off setting flag is "1" (step S53).

In a case where it is determined that the radio wave off setting flag is "1" (step S53: YES), the CPU 10 sets the wireless communication function of the mobile phone 1 on (effective) (step S54). Since an application, whose radio wave off setting flag is "1", has had the wireless communication function of the mobile phone 1 set off when activated, the CPU 10 releases the wireless communication function from being off, when such an application is to be finished. Specifically, the CPU 10 resumes the suspended power supply from the power source unit 65 to the RF block 60.

Next, the CPU 10 changes the radio wave off icon I11 displayed on the status display area GI1 to the antenna icon I12 (step S55).

Then, the CPU 10 finishes the application (step S56), and terminates this application finishing process. Specifically, in this case, while the application, to which the finishing instruction is given, is operating, the wireless communication function is in the off (ineffective) state. Therefore, when the application is to be finished, the wireless communication function is brought back to the on state to return to the standby state.

In a case where it is determined at step S53 that the radio wave off setting flag is not "1" (step S53: NO), the CPU 10 skips steps S54 and S55, finishes the application to which the finishing instruction is given (step S56), and terminates this application finishing process. Specifically, in this case, while the application, to which the finishing instruction is given, is operating, the wireless communication function is in the on (effective) state (communication-enable standby state). Therefore, when the application is simply finished, the mobile phone 1 returns to the standby state.

By the above-described application finishing process, even in a case where the wireless communication function was switched between on/off when an application was activated, the mobile phone 1 can finish the application, by returning to the communication (including phone calls and data communications) enable state in which the wireless communication function is on.

As described above, the mobile phone 1 displays an icon menu comprising a plurality of icons (symbols) representing symbolized applications (functional units) respectively, on the display section 20. Further, the application operation setting table 701 stores, for each of the plurality of applications, setting information regarding whether or not the RF block 60 is to be driven in parallel with executing the application. In displaying an icon menu on the display section 20, the mobile phone 1 displays an icon corresponding to an application which is set not to drive the RF block 60 in parallel with execution of it, by adding information indicating that the RF block 60 is not to be driven, based on the setting information stored in the application operation setting table 701 or the setting information input from the input section 30.

Therefore, the user of the mobile phone 1 can easily check, application by application, whether or not the application is set to drive the RF block 60 which executes the wireless communication function, when the user is to use any of the plurality of applications from the menu display screen or when the user is to set whether or not to have the RF block 60 driven on the menu display screen. By this check, the user can easily switch the mobile phone 1 between the wireless communication function effective state and the ineffective state, application by application.

Further, in displaying an icon menu on the display section 20, the mobile phone 1 displays an icon corresponding to an application, which is set not to have the RF block 60 driven in parallel with execution of it, by imposing the radio wave off icon I11 indicating that the RF block 60 is not to be driven.

Therefore, the user of the mobile phone 1 can visually know any application that is set not to use the wireless communication function.

Further, the mobile phone 1 displays an icon menu, which is a list of a plurality of applications, on the display section 20. The user inputs information from the input section 30 and sets whether or not to have the RF block 60 driven application by application. The application operation setting table 701 stored in the storage unit 70 stores, application by application, information regarding whether or not the application requires driving of the RF block 60. When the user is to make the above-described setting, the mobile phone 1 displays each application to be listed on the icon menu, differently from other applications, depending on whether or not it is an application that requires driving of the RF block 60, based on the setting information stored in the application operation setting table 701.

Therefore, when the user is to set whether or not to use the wireless communication function application by application, the mobile phone 1 can inform the user whether the application concerned requires the wireless communication function or not. Therefore, the user can be prevented from making any setting that is not assumed.

In the present embodiment, in response to an operation of the user, the mobile phone 1 stores, application by application, setting information whether the wireless communication function is kept effective or ineffective while the application is executed. Based on the setting information, the mobile phone 1 disables the wireless communication function while an application, which is set to make the wireless communication function ineffective, is executed.

Therefore, according to the present embodiment, when executing an application, the mobile phone 1 can automatically switch between the wireless communication function effective state and the ineffective state.

Furthermore, in the present embodiment, the power supply to the RF block 60 is stopped while an application, which is set to make the wireless communication function ineffective, is executed. Therefore, according to the present embodiment, the power to be consumed while the application is executed can be saved.

Note that the mobile phone 1 according to the present embodiment shows one example of the present invention. The present invention is not limited to the above-described embodiment. Therefore, the configuration and operation of the mobile phone 1 according to the preset embodiment can be changed arbitrarily.

Second Embodiment

For example, according to the above-described first embodiment, the radio wave off setting is made application by application. However, the radio wave off setting may be made based on other conditions than applications.

Hence, as the second embodiment of the present invention, a mobile phone 1, which can make the radio wave off setting based on applications and periods, will be explained.

Specifically, explanation will be given to a mobile phone 1, which has three radio wave off setting modes, namely, "continuous mode" for setting the radio wave off continuously, "date designation mode" for setting the radio wave off for a predetermined period designated by dates, and "time designation mode" for setting the radio wave off for a predetermined period designated by times.

FIG. 16 is a diagram showing an example of the data structure in an application operation setting table 702 according to the second embodiment of the present invention.

The application operation setting table 702 stores radio wave off date and radio wave off time, in addition to the information stored in the application operation setting table 701 shown in FIG. 3 in the first embodiment.

Radio wave off date is information indicating a period during which an application is set to the radio wave off state, by date. Radio wave off date comprises information including start date and end date to start and end the radio wave off setting. In a case where radio wave off dates are stored in the application operation setting table 702, the mobile phone 1 is set to the radio wave off state while the application with which the radio wave off dates are associated is executed if this execution takes place during the period from the start date to the end date.

Radio wave off time is information indicating a period during which an application is set to the radio wave off state, by time. Radio wave off time comprises information including start time and end time to start and end the radio wave off setting. In a case where radio wave off times are stored in the application operation setting table 702, the mobile phone 1 is set to the radio wave off state while the application with which the radio wave off times are associated is executed if this execution takes place during the period from the start time to the end time.

Figure 17:
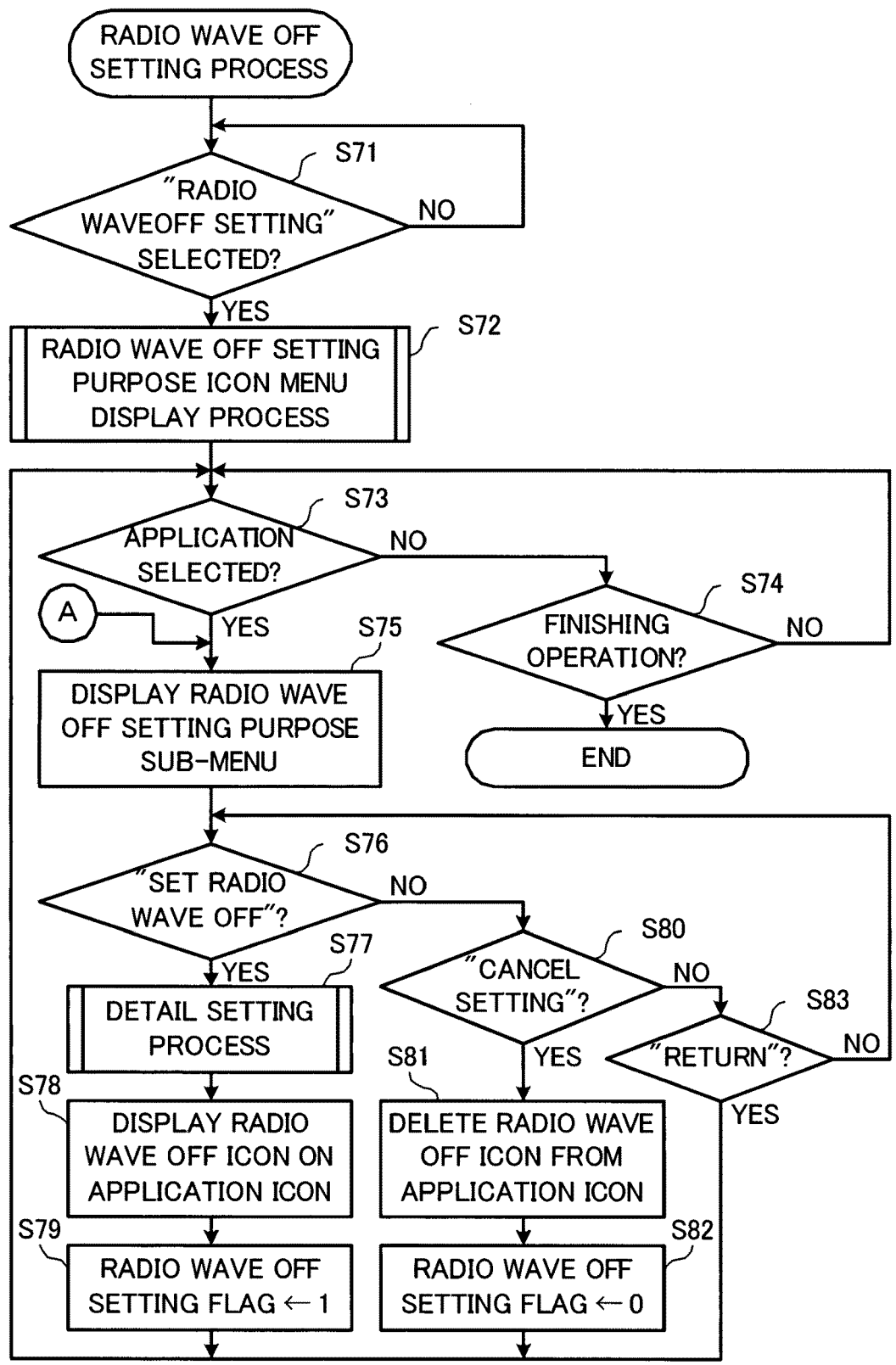
FIG. 17 is a flowchart showing a radio wave off setting process according to the second embodiment of the present invention.

FIG. 17 is a flowchart showing a radio wave off setting process according to the second embodiment of the present invention.

The radio wave off setting process according to the present embodiment is different from the radio wave off setting process of the first embodiment shown in FIG. 6, only in a detail setting process (step S77). Steps S71 to S76 of FIG. 17 are the same processes as steps S11 to S16 of FIG. 6, and steps S78 to S83 of FIG. 17 are the same processes as steps S17 to S22 of FIG. 6. Therefore, a detailed explanation of these processes will be omitted.

First, when the radio wave off setting process is started, the CPU 10 performs the processes of steps S71 to S75 to display the radio wave off setting purpose sub-menu M11 shown in FIG. 9 on the display section 20 (step S75).

Next, the CPU 10 determines whether or not "set radio wave off" is selected from the radio wave off setting purpose sub-menu M11 (step S76).

In a case where "set radio wave off" is selected (step S76: YES), the CPU 10 performs a detail setting process for making a detailed radio wave off setting (step S77). This detail setting process will be described later.

When the detail setting process is completed, the CPU 10 displays an application icon corresponding to the application set to the radio wave off state, with a radio wave off icon (step S78). For example, the CPU 10 synthesizes the image information of the application icon with the image information of the radio wave off icon, and displays the synthesized image on the main menu display area G12.

Then, the CPU 10 sets the value of the radio wave off setting flag of the application set to the radio wave off state in the application operation setting table 702, to "1" (step S79), and returns to step S73.

In a case where it is determined at step S76 that "set radio wave off" is not selected (step S76: NO), the CPU 10 performs the processes of steps S80 to S83 and returns to step S73 or S76.

Figure 18:
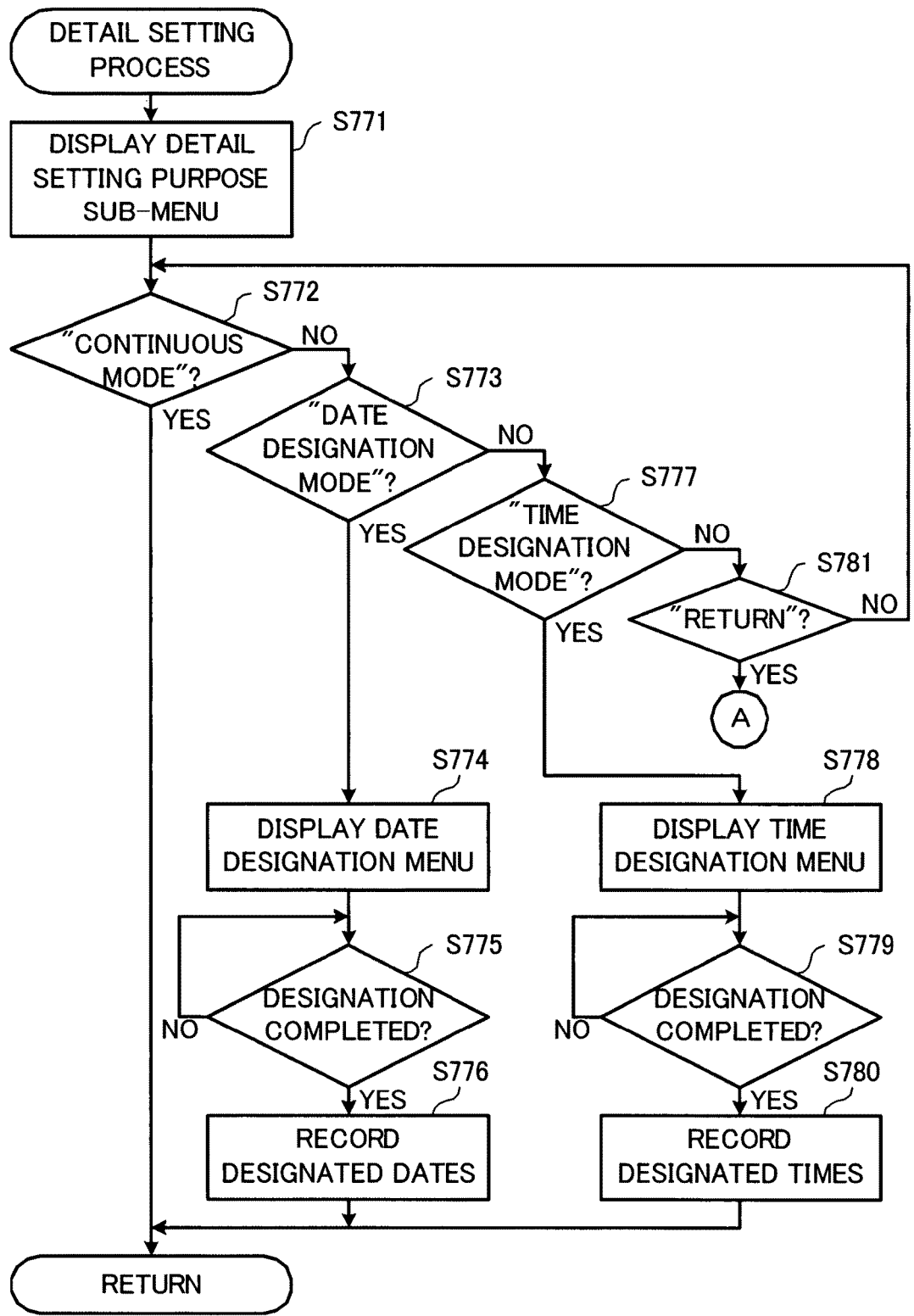
FIG. 18 is a flowchart showing a detail setting process in FIG. 17.

FIG. 18 is a flowchart showing the detail setting process of step S77.

In the detail setting process, first, the CPU 10 pops up a detail setting purpose sub-menu M12 and displays it on the main menu display area G12 of the display section 20 (step S771).

Figure 19:
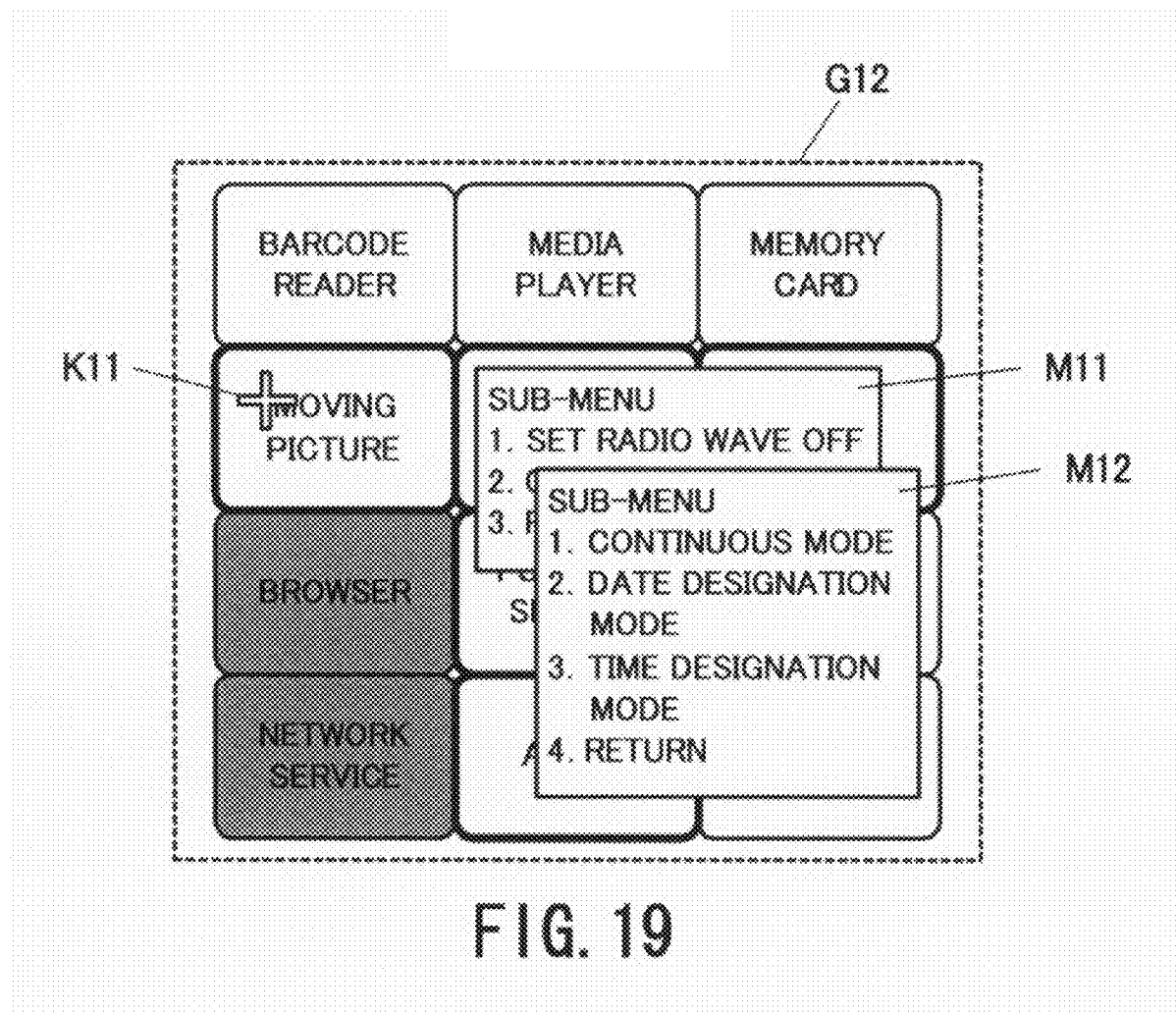
FIG. 19 is a diagram showing an example of how a sub-menu is displayed in the detail setting process.

FIG. 19 is a diagram showing an example of how the detail setting purpose sub-menu M12 is displayed.

As shown in FIG. 19, the detail setting purpose sub-menu M12 is popped up on the radio wave off setting purpose sub-menu M11. The detail setting purpose sub-menu M12 has items of "continuous mode", "date designation mode", "time designation mode", and "return". The user operates the input section 30 and selects any item from these items.

Returning to FIG. 18, the CPU 10 detects any operation of the user on the input section 30, and determines whether or not the "continuous mode" is selected from the detail setting purpose sub-menu M12 (step S772).

In a case where the "continuous mode" is selected (step S772: YES), the CPU 10 terminates this detail setting process and returns the flow to the radio wave off setting process of FIG. 17. The user selects this "continuous mode", when he/she wants the radio waves to be set off while the application concerned is executed, regardless of period or time.

In a case where it is determined that the "continuous mode" is not selected (step S772: NO), the CPU 10 determines whether or not the "date designation mode" is selected from the detail setting purpose sub-menu M12 (step S773).

In a case where the "date designation mode" is selected (step S773: YES), the CPU 10 displays a date designation menu on the main menu display area G12 (step S774).

FIG. 20 is a diagram showing an example of how the date designation menu M13 is displayed.

As shown in FIG. 20, the date designation menu M13 has a field for inputting a start date and a field for inputting an end date. The user designates the period during which the application concerned is executed in the radio wave off setting state, by inputting the years, months, and days, from this date designation menu M13.

The CPU 10 detects any operation of the user on the input section 30 to determine whether or not the date designation from the date designation menu M13 has been completed (step S775).

In a case where the date designation has not been completed (step S775: NO), the CPU 10 waits until the designation is completed.

Then, when the date designation is completed (step S775: YES), the CPU 10 records the designated dates in the radio wave off date field of the application selected at step S73 of FIG. 17 in the application operation setting table 702 (step S776), terminates this detail setting process, and returns the flow to the radio wave off setting process of FIG. 17.

In a case where it is determined at step S773 that the "date designation mode" is not selected (step S773: NO), the CPU 10 determines whether or not the "time designation mode" is selected from the detail setting purpose sub-menu M12 (step S777).

In a case where the "time designation mode" is selected (step S777: YES), the CPU 10 displays a time designation menu on the main menu display area G12 (step S778).

FIG. 21 is a diagram showing an example of how the time designation menu M14 is displayed.

As shown in FIG. 21, the time designation menu M14 has a field for inputting a start time and a field for inputting an end time. The user designates the period during which the application concerned is executed in the radio wave off state, by inputting hour and minute to start and end from this time designation menu M14.

The CPU 10 detects any operation of the user on the input section 30 to determine whether or not the time designation from the time designation menu M14 has been completed (step S779).

In a case where the time designation has not been completed (step S779: NO), the CPU 10 waits until the designation is completed.

Then when the time designation is completed (step S779: YES), the CPU 10 records the designated times in the radio wave off time fields of the application selected at step S73 of FIG. 17 in the application operation setting table 702 (step S780), terminates this detail setting process, and returns the flow to the radio wave off setting process of FIG. 17.

In a case where it is determined at step S777 that the "time designation mode" is not selected (step S777: NO), the CPU 10 determines whether or not "return" is selected from the detail setting purpose sub-menu M12 (step S781).

In a case where "return" is selected (step S781: YES), the flow returns to step S75 of FIG. 17, and the CPU 10 returns the screen to the radio wave off setting purpose sub-menu M11.

In a case where it is determined that "return" is not selected (step S781: NO), the flow returns to step S772, and the CPU 10 waits until any of "continuous mode", "date designation mode", "time designation mode", and "return" is selected from the details setting purpose sub-menu M12.

By the above-described detail setting process, a radio wave off period, which is designated by dates or times, is set for an application. Therefore, the user can make the radio wave off setting based on a more detailed condition, application by application.

In the present embodiment, any day of the week may be designated by "time designation mode", and the designated day of the week may be stored in the application operation setting table 702. In this case, the mobile phone 1 is set to the radio wave off state while an application concerned is executed, if this execution takes place during a period from the designated start time to the designated end time on the designated day of the week.

Further, while an application, for which a radio wave off period designated by radio wave off date or radio wave off time is set, is executed, the CPU 10 determines whether or not the current time is during the radio wave off period, sets the wireless communication function off if during the radio wave off period, and sets the wireless communication function on if not during the radio wave off period.

Next, a wireless communication function control process for controlling the wireless communication function on/off while an application is executed based on the radio wave off period set by the detail setting process will be explained.

Figure 22:
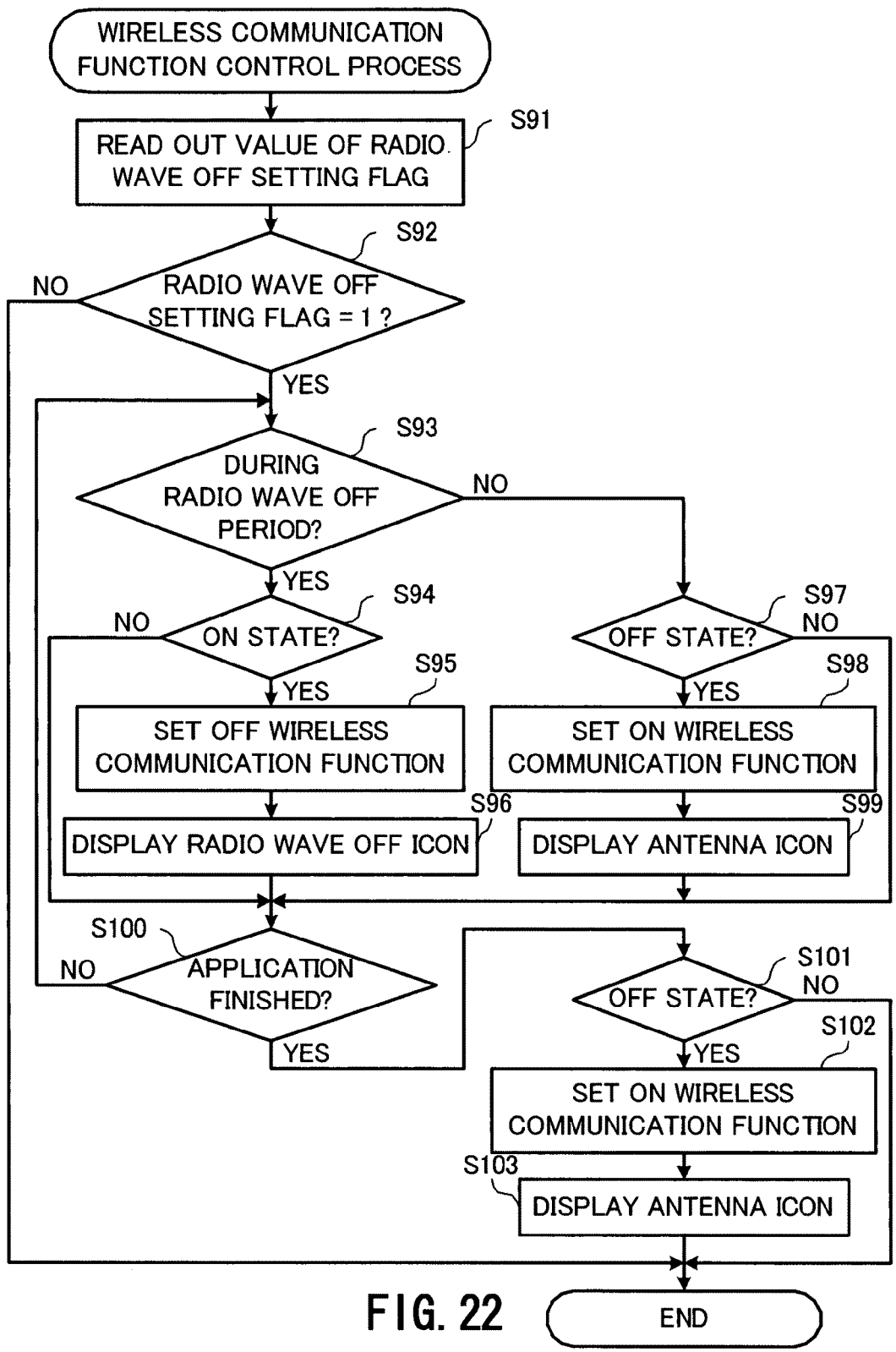
FIG. 22 is a flowchart showing a wireless communication function control process according to the second embodiment of the present invention.

FIG. 22 is a flowchart showing the wireless communication function control process according to the present embodiment.

This wireless communication function control process is started when an application is activated. Note that when activating an application, the mobile phone 1 is in the state of being able to perform wireless communication, i.e. in the wireless communication function on state.

First, the CPU 10 reads out the value of the radio wave off setting flag of the application activated, from the application operation setting table 702 (step S91).

Next, the CPU 10 determines whether or not the value of the read-out radio wave off setting flag is "1" (step S92).

In a case where the value of the radio wave off setting flag is not "1" (step S92: NO), the CPU 10 terminates this wireless communication function control process. Thus, while an application which is not set to the radio wave off mode in "continuous mode", "date designation mode", and "time designation mode" is executed, the wireless communication function is kept in the on state and the user can perform wireless communication.

To the contrary, in a case where the value of the radio wave off setting flag is "1" (step S92: YES), the CPU 10 determines whether or not the current date and time are during the radio wave off period set for the application activated (step S93).

Specifically, the CPU 10 reads out the radio wave off date or radio wave off time of the activated application from the application operation setting table 702. Then, the CPU 10 obtains the current date and time by the clock function. Then, the CPU 10 determines whether or not the current date and time are during the radio wave off period designated by the radio wave off date or radio wave off time.

Note that an application, whose radio wave off setting flag takes a value "1" but no radio wave off period is set for which, is an application set to the radio wave off mode in "continuous mode". Therefore, in a case where no radio wave off date or radio wave off time is stored in the application operation setting table 702 for the activated application, the CPU 10 determines at step S93 that any current time is during the radio wave off period.

In a case where the current date and time are during the radio wave off period (step S93: YES), the CPU 10 determines whether or not the wireless communication function is in the on state (step S94).

In a case where the wireless communication function is in the on state (step S94: YES), the CPU 10 sets the wireless communication function off (step S95), and displays the radio wave off icon I11 on the status display area G11 of the display section 20, as shown in FIG. 14B (step S96).

To the contrary, in a case where the wireless communication function is not in the on state (step S94: NO), the CU 10 skips steps S95 and S96 and keeps the wireless communication function in the off state.

In a case where it is determined at step S93 that the current date and time are not during the radio wave off period (step S93: NO), the CPU 10 determines whether or not the wireless communication function is in the off state (step S97).

In a case where the wireless communication function is in the off state (step S97: YES), the CPU 10 sets the wireless communication function on (step S98), and displays the antenna icon I12 on the status display area GI1 of the display section 20 as shown in FIG. 14A (step S99).

To the contrary, in a case where the wireless communication function is not in the off state (step S97: NO), the CPU 10 skips steps S98 and S99 and keeps the wireless communication function in the on state.

After steps S93 to S99, the CPU 10 determines whether or not the application is finished (step S100).

In a case where the application is not finished (step S100: NO), the CPU 10 returns the flow to the step S93. Accordingly, while the application is executed, the wireless communication function is set off only during the radio wave off period.

When the application is finished (step S100: YES), the CPU 10 determines whether or not the wireless communication function is in the off state (step S101).

In a case where the wireless communication function is in the off state (step S101: YES), the CPU 10 sets the wireless communication function on (step S102), displays the antenna icon I12 on the status display area GI1 of the display section 20 as shown in FIG. 14A (step S103), and terminates this wireless communication function control process.

To the contrary, in a case where the wireless communication function is not in the off state (step S101: NO), the CPU 10 skips steps S102 and S103, and terminates this wireless communication function control process with the wireless communication function kept in the on state. Accordingly, when the application is finished, the mobile phone 1 is returned to the wireless communication function on state.

By this wireless communication function control process, the mobile phone 1 can set off the wireless communication function, application by application, only during a previously-set period which is while an application concerned is executed.

The present invention is not limited to the above-described first and second embodiments.

For example, in the above-described embodiments, the mobile phone 1 was shown as an example of an electronic apparatus. However, electronic apparatuses such as a PDA (Personal Digital Assistant), a laptop PC (Personal Computer) may also be used.

In the above-described embodiments, the information indicating the status whether the wireless communication function is on or off is represented by the antenna icon I12 or the radio wave off icon Ill. However, the notification of the wireless communication status to the user is not limited to the icon display. For example, the wireless communication status of the mobile phone 1 may be indicated by a literal such as characters and numbers. Furthermore, the notification of the wireless communication status to the user is not limited to the screen display on the display section 20. For example, the wireless communication status of the mobile phone 1 may be shown by an alarm sound from the speaker 50.

In the above-described embodiments, in order that the applications which are set to the radio wave off state and the applications which are not set to the radio wave off state may be distinguished from each other, the radio wave off icon I11 is displayed while overlaid on the application icons corresponding to the applications set to the radio wave off state. However, an icon representing that an application concerned is not set to the radio wave off state may be displayed while overlaid on the application icons corresponding to the applications which are not set to the radio wave off state.

In the above-described embodiments, by an application being set to the radio wave off state, radio wave transmission and reception during the execution of the application are made ineffective. However, in a case where an application is set to the radio wave off state, only radio wave transmission may be made ineffective during the execution of the application. For example, when setting the mobile phone 1 to the radio wave off state, the CPU 10 may stop the power supply only for a radio wave radiation circuit in the RF block 60. This makes it possible to prohibit only the radiation of radio waves, which might give serious influences on the operations of other precision electronic apparatuses.

The functions of the CPU 10 of the mobile phone 1 according to the above-described embodiments can be realized not by software but by specially-made hardware.

Further, the functions of the mobile phone 1 may be realized by an ordinary computer system.

For example, the above-described embodiments have explained that in the mobile phone 1, operation programs are pre-stored in the storage unit 70, etc. However, a program for realizing the above-described operations may be stored and distributed in a computer-readable recording medium such as a CD-ROM (Compact Disk Read-Only Memory), a DVD (Digital Versatile Disk), an MO (Magneto-Optical disk), etc., so that an apparatus for performing the above-described operations may be configured by the program being installed on a computer.

Further, the program may be stored in a disk device or the like possessed by a predetermined server apparatus on a communication network such as the Internet, etc., and, for example, may be embedded on a carrier wave to be downloaded on a computer. Further, the above-described processes can also be realized by the program being activated and executed while the program is transferred through a communication network.

Further, in a case where the above-described functions are realized by an OS (Operating System) taking part, or in a case where the functions are realized by the OS and the applications in cooperation, the other parts than those realized by the OS may only be stored and distributed in a medium, or may be downloaded on a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-67198 filed on Mar. 13, 2006 and Japanese Patent Application No. 2007-54872 filed on Mar. 5, 2007 and including specification, claims, drawings and summary. The disclosures of the above Japanese Patent Applications are incorporated herein by reference in their entireties.

What is claimed is:

1. An electronic apparatus having a plurality of applications, comprising:
   a wireless communication unit which performs wireless communication, when it is activated;
   a display unit which displays pieces of application identification information corresponding to the plurality of applications respectively in a list format, in order for a user to designate an application from the plurality of applications;
   a setting unit which sets, for each of the plurality of applications, information indicating whether or not the wireless communication unit is to be activated while the application is executed, in response to an operation of the user; and
   a first display control unit which controls the display unit to display the application identification information by adding thereto, setting identification information, which corresponds to the information set by the setting unit for the application identified by the application identification information, when the display unit is to display the pieces of application identification information in a list format in order for the user to designate an application to be executed~
   wherein the first display control unit is configured to: detect the information set by the setting unit; associate an application with the information set by the setting unit; and
   display on the display unit said pieces of application identification information and the associated information set by the setting unit.

2. The electronic apparatus according to claim 1,
   wherein the pieces of application identification information are different images which correspond to the plurality of applications respectively,
   the setting identification information is an image which corresponds to information that the wireless communication unit is not to be activated,
   the setting unit sets, for at least one application, information that the wireless communication unit is not to be activated while the application is executed, and
   the first display control unit controls the display unit to display the image corresponding to the information that the wireless communication unit is not to be activated, by overlaying this image on the image corresponding to the application for which the setting unit sets the information that the wireless communication unit is not to be activated.

3. The electronic apparatus according to claim 1, further comprising: a storage unit which stores, for each of the plurality of applications, information indicating whether or not each application is an application which includes a function executable even if the wireless communication unit is not activated, in association with each of the plurality of applications; and
   a second display control unit which controls the display unit to display the application identification information, in association with the information stored in association with the application identified by the application identification information in the storage unit, when the display unit is to display the pieces of application identification information in a list format in order for the user to designate an application for which information is to be set by the setting unit, wherein the setting unit sets, for an application to which information indicating that the application is an application which includes a function executable even if the wireless communication unit is not activated is associated in the storage unit, information indicating whether or not the wireless communication unit is to be activated while the application is executed.

4. The electronic apparatus according to claim 2, further comprising:
   a storage unit which stores, for each of the plurality of applications, information indicating whether or not each application is an application which includes a function executable even if the wireless communication unit is not activated, in association with each of the plurality of applications; and
   a second display control unit which controls the display unit to display the application identification information, in association with the information stored in association with the application identified by the application identification information in the storage unit, when the display unit is to display the pieces of application identification information in a list format in order for the user to designate an application for which information is to be set by the setting unit,
   wherein the setting unit sets, for an application to which information indicating that the application is an application which includes a function executable even if the wireless communication unit is not activated is associated in the storage unit, information indicating whether or not the wireless communication unit is to be activated while the application is executed.

5. A computer-readable recording medium storing a program for controlling a computer having a plurality of applications to perform:
   a setting step of setting, for each of the plurality of applications, information indicating whether or not a wireless communication process is allowed while the application is executed, in response to an operation of a user;
   a displaying step of displaying pieces of application identification information corresponding to the plurality of applications respectively in a list format on a display unit, in order for the user to designate an application from the plurality of applications; and a display controlling step of controlling the display unit to display the application identification information by adding thereto, setting identification information, which corresponds to the information set at the setting step for the application identified by the application identification information, when the pieces of application identification information are to be displayed in a list format at the displaying step in order for the user to designate an application to be executed:
   wherein the display controlling step further comprises: detecting the information set by the setting step; associating an application with the information set by the setting step; and
   display on the display unit said pieces of application identification information and the associated information.

* * * * *